US011973661B1

(12) United States Patent
Griffin et al.

(10) Patent No.: US 11,973,661 B1
(45) Date of Patent: Apr. 30, 2024

(54) DATA CENTER RESILIENCY RECOMMENDER

(71) Applicant: International Business Machines Corporation, Armonk, NY (US)

(72) Inventors: Thomas Downes Griffin, Campbell, CA (US); Stephen Buckley, White Plains, NY (US); Eric Kevin Butler, San Jose, CA (US); Divyesh Jadav, San Jose, CA (US); Rakesh Jain, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/179,628

(22) Filed: Mar. 7, 2023

(51) Int. Cl.
*H04L 41/14* (2022.01)
*H04L 41/0677* (2022.01)

(52) U.S. Cl.
CPC ........ *H04L 41/145* (2013.01); *H04L 41/0677* (2013.01)

(58) Field of Classification Search
CPC .................. H04L 41/145; H04L 41/0677
See application file for complete search history.

(56) References Cited

U.S. PATENT DOCUMENTS

| 7,069,468 | B1 | 6/2006 | Olson et al. |
| 7,133,907 | B2 | 11/2006 | Carlson et al. |
| 9,917,767 | B2 | 3/2018 | Chen et al. |
| 10,338,913 | B2 | 7/2019 | Franchitti |
| 11,074,061 | B2 | 7/2021 | Franchitti |
| 11,080,157 | B1 * | 8/2021 | Roberts .................. H04L 41/14 |
| 11,138,103 | B1 | 10/2021 | Shi et al. |
| 11,888,701 | B1 * | 1/2024 | Liu ......................... H04L 41/12 |
| 2006/0268742 | A1 * | 11/2006 | Chu ..................... H04L 43/0811 370/254 |
| 2008/0250042 | A1 | 10/2008 | Mopur et al. |
| 2010/0332991 | A1 * | 12/2010 | Banerjee ................ H04L 41/12 709/224 |

(Continued)

FOREIGN PATENT DOCUMENTS

| CA | 2843355 A1 * | 2/2013 | ............ H04L 41/12 |
| EP | 4030728 A1 * | 7/2022 | ......... H04L 41/0654 |

OTHER PUBLICATIONS

Anonymous, "Designing and Managing Data Centers for Resilience: Demand Response and Microgrids", U.S. Department of Energy, Office of Energy Efficiency & Renewable Energy, 64 pages.

(Continued)

*Primary Examiner* — Hee Soo Kim
(74) *Attorney, Agent, or Firm* — CANTOR COLBURN LLP; Kelsey M. Skodje

(57) ABSTRACT

Embodiments of the invention are directed to a computer system that includes a memory electronically coupled to a processor system. The processor system is operable to perform processor system operations that include accessing a graph model representation of a computer network. The graph model is used to implement a resiliency-problem identification analysis that identifies a set of resiliency problems in the graph model. The graph model is used to apply a resiliency-problem solution analysis to a resiliency problem in the set of resiliency problems to generate a set of resiliency-problem solutions. Each resiliency-problem solution in the set of resiliency-problem solutions is ranked.

25 Claims, 19 Drawing Sheets

(56) References Cited

U.S. PATENT DOCUMENTS

| | | | | |
|---|---|---|---|---|
| 2013/0024579 | A1* | 1/2013 | Zhang | H04W 16/18 |
| | | | | 709/230 |
| 2020/0403985 | A1* | 12/2020 | Mahadevan | H04L 41/084 |
| 2021/0409306 | A1* | 12/2021 | Neog | H04L 41/149 |
| 2022/0060497 | A1* | 2/2022 | Crabtree | G06N 20/00 |
| 2022/0078130 | A1* | 3/2022 | Ros-Giralt | H04L 47/745 |
| 2022/0329522 | A1* | 10/2022 | Maciocco | H04L 41/16 |

OTHER PUBLICATIONS

Anonymous, "Estimation of Sparse Matrix Rank in Recommender Systems", IPCOM000241756D, IP. com, May 28, 2015, 5 pages.

Anonymous, "Intelligent Maintenance Scheduler Based on Contextual Analysis", IPCOM000266230D, IP. com, Jun. 24, 2021, 11 pages.

Anonymous, "Suggestion on the Suitability of a Skilled Candidate within a Geofenced and Trusted Contact Network", IPCOM000269541D, IP. com, Apr. 25, 2022, 3 pages.

Dai, et al, "Optimal Scheduling of Data-Intensive Applications in Cloud-Based Video Distribution Services", IEEE Transactions on Circuits and Systems for Video Technology, vol. 27, 2017, 11 pages.

Fleming, et al, "Cyberphysical Security Through Resiliency: A Systems-Centric Approach", IEEE Computer Society, 2021, pp. 36-45.

Pachot, et al, "Production2Vec: a hybrid recommender system combining semantic and product complexity approach to improve industrial resiliency", Association for Computing Machinery (ACM), 2021, 7 pages.

* cited by examiner

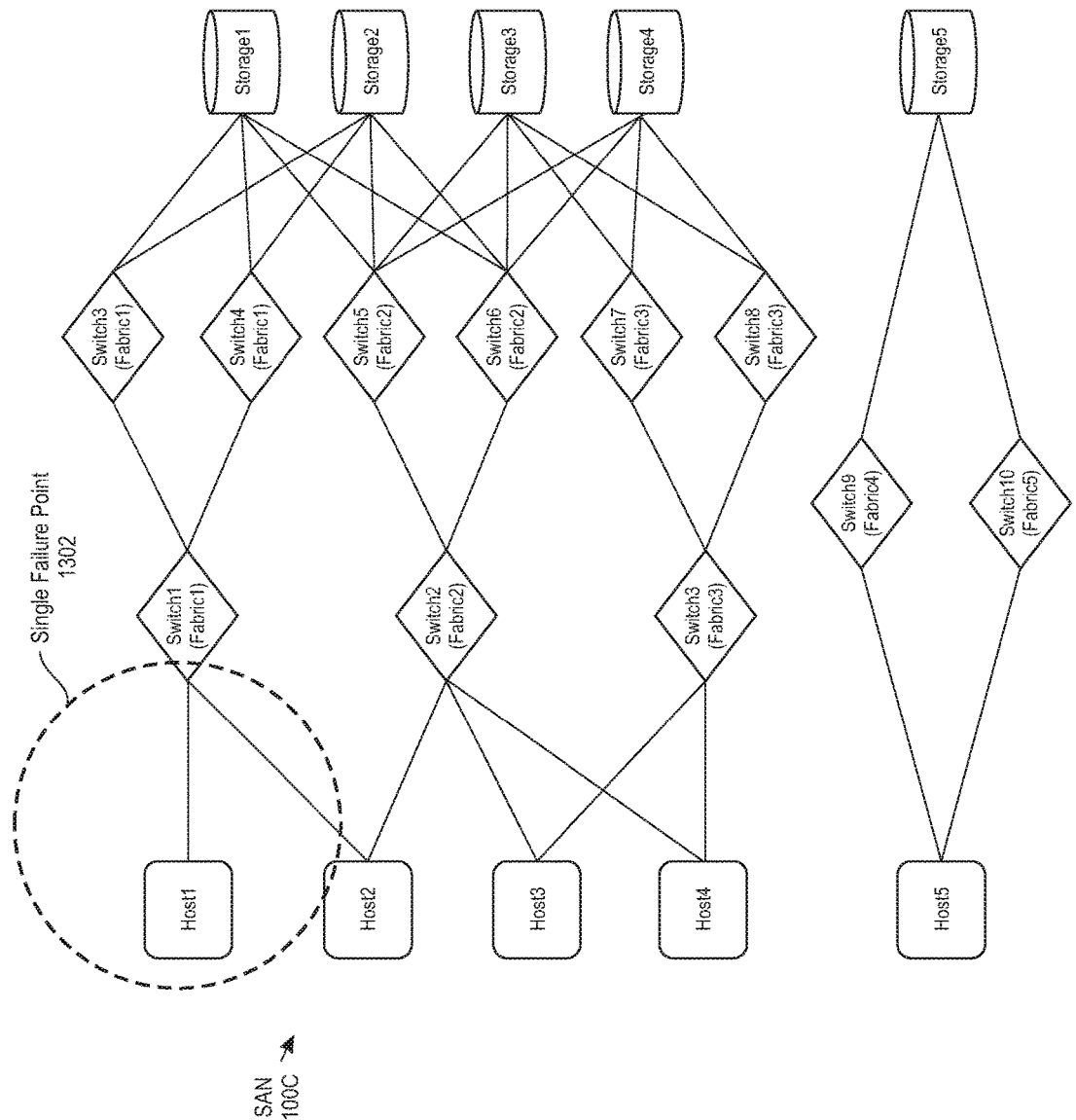

| Rank | Switch | Tier 1 | Tier 2 | Tier 3 |
|---|---|---|---|---|
| 1 | Switch2 | 100 | 100 | 60 |
| 2* | Switch5 | 100 | 50 | 80 |
| 2* | Switch6 | 100 | 50 | 80 |
| 4 | Switch3 | 0 | 100 | 60 |
| 5* | Switch9 | 0 | 50 | 90 |
| 5* | Switch10 | 0 | 50 | 90 |
| 7* | Switch7 | 0 | 50 | 80 |
| 7* | Switch8 | 0 | 50 | 80 |

* Two or more switches have the same score and how these ties are broken can be arbitrary Table 1400

FIG. 14

DATA CENTER RESILIENCY RECOMMENDER

BACKGROUND

The present invention relates in general to programmable computers used to implement data centers. More specifically, the present invention relates to computing systems, computer-implemented methods, and computer program products operable to automatically and dynamically identify a lack of resiliency in a data network and recommend a network reconfiguration to address the lack of resiliency.

A data center is a physical room, building or facility that houses information technology (IT) infrastructure for building, running, and delivering applications and services, and for storing and managing the data associated with those applications and services. Data centers have evolved from privately-owned, tightly-controlled on-premises facilities housing traditional IT infrastructure for the exclusive use of one company, to remote facilities or networks of facilities owned by cloud service providers housing virtualized IT infrastructure for the shared use of multiple companies and customers.

There are different types of data center facilities, including, for example, enterprise (on-premises) data centers, public cloud data centers, managed data centers, and collocation facilities. In the enterprise data center model, all IT infrastructure and data are hosted on-premises. An entity can choose to have its own on-premises data centers to provide the entity with more control over information security, and can more easily comply with various types of regulations such as the U.S. Health Insurance Portability and Accountability Act (HIPAA). In an enterprise data center, the entity is responsible for all deployment, monitoring, and management tasks. Public cloud data centers (also known as cloud computing data centers) house IT infrastructure resources for shared use by multiple customers (e.g., from scores to millions of customers) using an Internet connection. Many of the largest cloud data centers (known as hyper-scale data centers) are run by major cloud service providers such as IBM Cloud®. Cloud providers often run several hyper-scale data centers throughout the world. Typically, cloud service providers maintain smaller, edge data centers located closer to cloud customers (and cloud customers' customers). For real-time, data-intensive workloads such big data analytics, artificial intelligence (AI), and content delivery applications, edge data centers can help minimize latency, thereby improving overall application performance and customer experience. Managed data centers are typically used by organizations that do not have the space, staff, or expertise to deploy and manage some or all of their IT infrastructure on premises but prefer not to host that infrastructure using the shared resources of a public cloud data center. In a managed data center, the client company leases dedicated servers, storage and networking hardware from the data center provider; and the data center provider handles the administration, monitoring and management for the client company. In a colocation facility, the client company owns all the infrastructure and leases a dedicated space to host it within the facility. In a traditional colocation model, the client company has sole access to the hardware and full responsibility for managing it. This can be ideal for privacy and security but is often impractical, particularly during outages or emergencies. Thus, some colocation providers offer management and monitoring services for clients who want them.

Data centers have evolved from traditional IT architecture (e.g., where every application or workload runs on its own dedicated hardware) to cloud architecture in which physical hardware resources (e.g., CPUs, storage, networking, etc.) are virtualized. Virtualization enables these resources to be abstracted from their physical limits, and pooled into capacity that can be allocated across multiple applications and workloads in whatever quantities they require. Virtualization also enables software-defined infrastructure (SDI) that can be provisioned, configured, run, maintained and "spun down" programmatically without human intervention.

The major components of a data center include servers and storage systems coupled to one another through various networking systems. Servers are powerful computers that deliver applications, services and data to end-user devices. Most servers include some local storage capability (known as direct-attached storage (DAS)) to enable the most frequently used data (hot data) to remain close the CPU. Two other data center storage configurations include network-attached storage (NAS) and a storage area network (SAN). NAS provides data storage and data access to multiple servers over a standard ethernet connection. A NAS device is usually a dedicated server with multiple storage media such as hard disk drives (HDDs) and/or solid state drives (SSDs). Similar to NAS, a SAN enables shared storage. However, a SAN uses a separate network for the data and is implemented using a more complex mix of multiple storage servers, application servers, and storage management software. A single data center can use all three storage configurations (DAS, NAS, and SAN), as well as file storage, block storage and object storage types.

The networking systems that connect the servers, storage systems, and other major components of a data center are typically formed from various types of switches, routers and fiber optics operable to carry network traffic across the servers (called east/west traffic) and to/from the servers to the clients (called north/south traffic). A data center's network services can be virtualized, which enables the creation of software-defined overlay networks built on top of the network's physical infrastructure to accommodate specific security controls or service level agreements (SLAs).

Data center downtime is costly to data center providers and their customers. Accordingly, data center operators and architects configure data center components to increase resiliency of data center systems. In general, the term "resiliency" as applied to computing infrastructure means that the computing infrastructure provides continuous business operation (i.e., highly resistant to disruption and able to operate in a degraded mode if damaged), rapid recovery if failure does occur, and the ability to scale to meet rapid or unpredictable demands.

The data traffic connections (e.g., switches) between major components of a conventional SAN configuration are prone to disruption and failure. Thus, the SAN components of a data center are areas where resiliency is particularly important. One approach to maintaining resiliency is to configure SAN components redundantly in order to maintain functionality if components and/or connections fail at any given time. In general, redundant configurations do not include a single point of failure such that, if it fails, one or more hosts are no longer connected to the SAN.

However, when configuring a large data center having hundreds or thousands of nodes (i.e., components), it can be difficult to avoid unintentionally including single points of failure that create network areas or regions that lack redundancy and therefore lack resiliency. For example, manual data center configuration errors can include not properly connecting certain nodes or missing connections that were intended. Alternatively, redundancy flaws can be present in parts of the data center design, or a connection fails after configuration. As noted, SAN components (particularly switches) are prone to failure. Even when a SAN configuration is initially designed and set up to have redundancy, configurations typically change over time, thereby making it difficult to ensure that new SAN components and connections do not undo the redundancy that was provided in the initial SAN configuration. Due to the complexity and scale of a conventional data center, manually identifying network resiliency issues is not feasible. Furthermore, identifying optimal solutions to network resiliency problems is similarly complicated, as there can be dozens of fixes that all technically work. Additionally, some resiliency fixes will innately be better than others. For example, connecting a host to a switch that does not connect to the host's initial storage connections is not as optimal as connecting the host to a switch that does connect to the host's initial storage connections.

SUMMARY

Embodiments of the invention are directed to a computer system that includes a memory electronically coupled to a processor system. The processor system is operable to perform processor system operations that include accessing a graph model representation of a computer network. The graph model is used to implement a resiliency-problem identification analysis that identifies a set of resiliency problems in the graph model. The graph model is used to apply a resiliency-problem solution analysis to a resiliency problem in the set of resiliency problems to generate a set of resiliency-problem solutions. Each resiliency-problem solution in the set of resiliency-problem solutions is ranked.

The above-described computer system provides technical effects and benefits by providing a graph-based mechanism configured and arranged in a novel way to analyze resiliency issues in the configuration of a computer network. Representing the computer network as a graph model allows network components and network relationships to be captured and preserved. Representing the computer network as a graph also allows a resiliency-problem identification analysis to be performed on the graph model that identifies resiliency problems in the graph model, where the identified resiliency problems represent corresponding resiliency problems in the computer network. Representing the computer network as a graph also allows a resiliency-problem solution analysis to be applied to a resiliency problem in the set of resiliency problems to generate a set of resiliency-problem solutions, which are then ranked. Accordingly, the above-described computer system enables the automatic identification of resiliency problems in a large and complicated computer network; the automatic evaluation of multiple complex resiliency-problems solutions; and the automatic ranking of the multiple complex resiliency-problem solutions to enable the fast (e.g., in milliseconds) and consistent identification of resiliency problems and generation of the most effective solution(s) to the identified resiliency problems.

In addition to one or more of the features described herein, or as an alternative to any of the embodiments of the invention described herein, the graph model includes a graph database.

Implementing the graph model to include a graph database provides technical effects and benefits by leveraging features, operators, and general functionality of the graph database to implement aspects of the invention, including the resiliency-problem identification analysis, the resiliency-problem solution analysis, and the ranking operations. The graph database implements a number of efficient operations that can be leveraged to create a graph structure model; query the graph structure model for various conditions in the graph structure model; and/or transform subsections of the graph structure model. Implementing the graph model to include a graph database also enables scaling of the above-described computer system to large computer networks having, for example, hundreds of components (e.g., hosts, switches, and storage components) and thousands of connections and potential connections.

In addition to one or more of the features described herein, or as an alternative to any of the embodiments of the invention described herein, the resiliency-problem solution analysis includes generating a set of initial candidate resiliency-problem solutions; and generating, using a set of final candidate resiliency-problem solution criteria, a set of final candidate resiliency-problem solutions from the set of initial candidate resiliency-problem solutions, wherein the set of resiliency-problem solutions includes the set of final candidate resiliency-problem solutions.

The above-described implementation of the resiliency-problem solution analysis provides technical effects and benefits by using a set of final candidate resiliency-problem solution criteria to limit the number of resiliency problems that need to be ranked, thereby reducing the computational burden of performing ranking operations. The final candidate resiliency-problem solution criteria provide further technical effects and benefits by allowing the final candidate resiliency-problem solution criteria to be tailored for the particular resiliency issue (e.g., where the resiliency issue is a redundancy issue), and to be further tailored to meet the priorities and preferences of each individual user of the computer system.

In addition to one or more of the features described herein, or as an alternative to any of the embodiments of the invention described herein, ranking each final candidate resiliency-problem solution includes assigning to each final candidate resiliency-problem solution one of a plurality of ranking tiers. In some embodiments of the invention, assigning to each final candidate resiliency-problem solution one of the plurality of ranking tiers is based at least in part on a set of ranking criteria. In some embodiments of the invention, the set of ranking criteria includes a set of user-determined ranking criteria.

The above-described implementation of the ranking operations provides technical effects and benefits by using ranking tiers to provide a consistent standard for evaluating/ranking the final candidate resiliency-problem solutions, thereby reducing potential inconsistent ranking determination. The use of ranking criteria provides further technical effects and benefits by allowing the ranking criteria to be tailored for the particular resiliency issue (e.g., where the resiliency issue is a redundancy issue), and to be further tailored to meet the priorities and preferences of each individual user of the computer system.

Embodiments of the invention are directed to a computer system that includes a memory electronically coupled to a processor system. The processor system is operable to perform processor system operations that include accessing a graph model representation of a storage area network (SAN) of a data center computer network, where the SAN includes SAN switches, and where the graph model includes a graph database. The graph database is used to implement a resiliency-problem identification analysis that identifies a set of resiliency problems in the SAN switches represented in the graph database. The graph database is further used to apply a resiliency-problem solution analysis to a resiliency problem in the set of resiliency problems to generate a set of resiliency-problem solutions. Each resiliency-problem solution in the set of resiliency-problem solutions is ranked.

The above-described computer system provides technical effects and benefits by providing a graph-based mechanism configured and arranged in a novel way to analyze resiliency issues in the configuration of a SAN of a data center computer network, where the SAN includes SAN switches. Representing the SAN as a graph model allows SAN components and SAN network-based relationships to be captured and preserved. Representing the SAN as a graph also allows a resiliency-problem identification analysis to be performed on the graph model that identifies resiliency problems in the SAN switches represented in the graph database, where the identified resiliency problems represent corresponding resiliency problems in the SAN switches of the SAN. Representing the SAN as a graph also allows a resiliency-problem solution analysis to be applied to a resiliency problem in the set of resiliency problems to generate a set of resiliency-problem solutions, which are then ranked. Accordingly, the above-described computer system enables the automatic identification of resiliency problems in a large and complicated SAN; the automatic evaluation of multiple complex resiliency-problems solutions; and the automatic ranking of the multiple complex resiliency-problem solutions to enable the fast (e.g., in milliseconds) and consistent identification of resiliency problems and generation of the most effective solution(s) to the identified resiliency problems.

Implementing the graph model to include a graph database provides technical effects and benefits by leveraging features, operators, and general functionality of the graph database to implement aspects of the invention, including the resiliency-problem identification analysis, the resiliency-problem solution analysis, and the ranking operations. The graph database implements a number of efficient operations that can be leveraged to create a graph structure model; query the graph structure model for various conditions in the graph structure model; and/or transform subsections of the graph structure model. Implementing the graph model to include a graph database also enables scaling of the above-described computer system to a large SAN having, for example, hundreds of components (e.g., hosts, switches, and storage components) and thousands of connections and potential connections.

Embodiments of the invention are also directed to computer-implemented methods and computer program products having substantially the same features, technical effects, and technical benefits as the computer system described above.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

FIG. 13 depicts a simplified block diagram illustrating an example of how a resiliency recommender system can be applied to a storage area network (SAN) in accordance with embodiments of the invention;

FIG. 14 depicts a table illustrating an example of how a resiliency recommender system can be applied to a SAN in accordance with embodiments of the invention;

Figure 1:
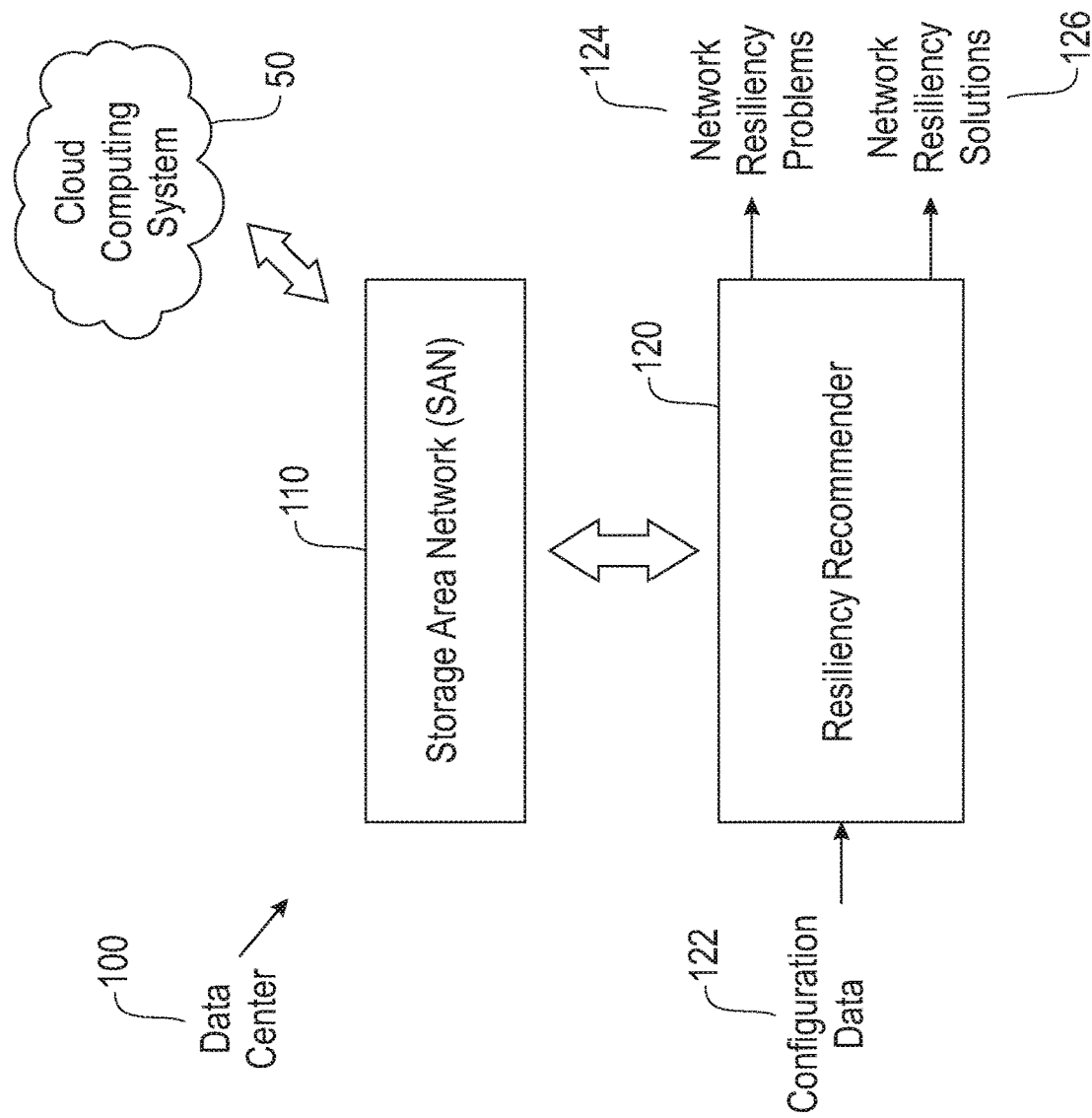
FIG. 1 depicts a simplified block diagram illustrating a system in accordance with embodiments of the invention.

In the accompanying figures and following detailed description of the disclosed embodiments, the various elements illustrated in the figures are provided with three digit reference numbers. In some instances, the leftmost digits of each reference number corresponds to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units of the systems described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, function as the module and achieve the stated purpose for the module.

The various components/modules/models of the systems illustrated herein are depicted separately for ease of illustration and explanation. In embodiments of the invention, the functions performed by the various components/modules/models can be distributed differently than shown without departing from the scope of the various embodiments of the invention describe herein unless it is specifically stated otherwise.

Turning now to an overview of technologies that are relevant to aspects of the invention, as previously noted herein, a data center is a physical room, building or facility that houses IT infrastructure for building, running, and delivering applications and services, and for storing and managing the data associated with those applications and services. Given the importance of data center to the operations of an enterprise, data center downtime is costly to data center providers and to their customers. Accordingly, data center operators and architects configure data center components to increase resiliency of data center systems. In general, the term "resiliency" as applied to computing infrastructure means that the computing infrastructure provides continuous business operation (i.e., highly resistant to disruption and able to operate in a degraded mode if damaged), rapid recovery if failure does occur, and the ability to scale to meet rapid or unpredictable demands.

The components (e.g., switches) that traffic data among the hosts and storage areas of a conventional SAN configuration are prone to disruption and failure. Thus, the SAN components of a data center are areas where resiliency is particularly important. One approach to maintaining resiliency is to configure SAN components redundantly in order to maintain functionality if components and/or connections fail at any given time. In general, redundant configurations do not include a single point of failure such that, if it fails, one or more hosts are no longer connected to the SAN.

However, when configuring large data centers with hundreds or thousands of nodes (or components), it can be difficult to avoid unintentionally including single points of failure that create network areas or regions that lack redundancy and therefore lack resiliency. For example, manual data center configuration errors include not properly connecting certain nodes or missing connections that were intended. Alternatively, redundancy flaws can be present in parts of the data center design, or a connection fails after configuration. As noted, SAN components (particularly switches) are prone to failure. Even when a SAN configuration is initially designed and set up to have redundancy, configurations typically change over time, thereby making it difficult to ensure that new nodes and connections do not undo the redundancy that was provided in the initial SAN configuration. Due to the complexity and scale of a conventional data center, as well as the extremely fast performance expectations for data center operation, manually identifying network resiliency these issues is not feasible. Furthermore, identifying optimal solutions to network resiliency problems is similarly complicated, as there can be dozens of fixes that all technically work. Additionally, some resiliency fixes will innately be better than others. For example connecting a host to a switch that does not connect to the host's initial storage connections is not as optimal as connecting the host to a switch that does connect to the host's initial storage connections. Currently, there is no systematic, fast, and reliable method that moves beyond known ad hoc, a priori methods of identifying resiliency/redundancy problems in data center networks to automatically, dynamically, and reliably identify and prioritize potential solutions to the identified resiliency/redundancy problems.

Turning now to an overview of aspects of the invention, embodiments of the invention address the above-described shortcomings by providing computing systems, computer-implemented methods, and computer program products operable to automatically and dynamically identify a lack of resiliency in a data network and recommend a network reconfiguration (i.e., a network "fix") to address the lack of resiliency. In embodiments of the invention, a resiliency recommender is provided and made operable to either receive or generate a model of a portion of the data center that is under analysis. Because the SAN portion(s) of a data center includes complicated configurations that are routinely updated, and because the SAN portion(s) of a data center further include failure prone component (e.g., switches), the SAN portion of a data center is a strong candidate for selection as the portion of the data center that is under analysis. Although aspects of this detailed description focus on embodiments of the invention where the SAN portion of the data center has been selected as the portion of the data center that is under analysis for resiliency problems/issues, the embodiments of the invention described herein can be applied to any suitable portion of a data center where resiliency problems/issues can develop.

In some embodiments of the invention, the model of the SAN is represented as a graph model configured to represent through its nodes and edges the full configuration of the SAN, including SAN components, connections, characteristics, and functionality. Information about the SAN configuration can be gathered and ingested into a graph model using any suitable method(s) and following any suitable schedule. For example, in some embodiments of the invention, information about the SAN configuration can be gathered using known network scanning systems operable to automatically and dynamically scan the SAN components according to a predetermined schedule in order to pull the functionality, connectivity, and other configuration information of the various components that make up the SAN. In some embodiments of the invention, the information about the SAN configuration can be gathered at any stage, including during initial SAN design, during SAN testing, during normal in-service SAN operation, in connection with SAN configuration updates/changes, and during any user-selected circumstance. In embodiments of the invention, the network scanning system can be separate from or incorporated within the resiliency recommender. In embodiments of the invention, the information about the SAN configuration can be assembled and ingested into a graph model at selected stages of the SAN configuration, update, testing, or in-service operation processes so the resiliency recommender can automatically and dynamically confirm that resiliency problems are not present in the SAN configuration. Additionally, in some embodiments of the invention, information about the SAN configuration can be ingested into a graph model whenever service operations of the SAN are unintentionally interrupted (e.g., because of an unexpected switch failure) so the resiliency recommender can be used to automatically and dynamically determine whether the service interruption is due to a resiliency problem in the SAN configuration; and recommend a solution to the resiliency problem if a resiliency problem is detected.

In embodiments of the invention, the resiliency recommender is operable to use the SAN graph model to automatically and dynamically perform analyses that identify resiliency problems in the SAN graph model, generate a proposed set of the solutions to the identified resiliency problems, and rank the proposed set of solution to the identified resiliency problems. In embodiments of the invention, the analyses performed by the SAN graph model include a resiliency-problem identification analysis that identifies a set of resiliency problems in the SAN graph model. In some embodiments of the invention, the resiliency problem includes a redundancy problem. One approach to maintaining resiliency is to configure SAN components (e.g., host computers coupled through switches to storage areas) redundantly in order to maintain functionality if components and/or connections fail at any given time. Redundant configurations do not include a single point of failure. In general, a single point of failure is a point in the network (e.g., a switch) where, if it fails, one or more hosts are no longer connected to the SAN. In embodiments of the invention where the resiliency problem is a redundancy problem, the resiliency-problem identification analysis can be implemented by determining that any one of the following conditions is true, namely, a SAN host is only connected to one SAN switch or one SAN switch fabric; a SAN storage system is only connected to one SAN switch or one SAN switch fabric; and a SAN "source" switch is only connected to one SAN "destination" switch in the next layer of fabric. In general, a computer network's switch fabric is the basic topology of how a network is laid out and connected to switch traffic on a data or circuit-switched network. In a switch fabric, switch-based connections are configured in a matrix, and the term "fabric" comes from the matrix nature of the switch fabric in which any port of the switch fabric can connect to any other port of the switch fabric by taking a path through the matrix or "fabric."

In embodiments of the invention, the analyses performed by the SAN graph model further includes a resiliency-problem solution analysis that is applied to a resiliency problem in the set of resiliency problems to generate a set of resiliency-problem solutions. In some embodiments of the invention, the resiliency-problem solution analysis analyzes a set of initial candidate resiliency-problem solutions to generate a set of final candidate resiliency-problem solutions (e.g., candidate switches that could be connected to the problematic SAN component in order to fix it) according to a set of final candidate criteria (i.e., criteria applied to the initial candidates to generate therefrom a set of final candidates). In embodiments of the invention where the resiliency problem is a redundancy problem, the set of final candidate criteria include a set of requirements such as the candidate resiliency-problem solution being in a different fabric than a SAN component's original switch connection, and/or the candidate resiliency-problem solution connecting the SAN component being connected to storage.

In embodiments of the invention, the resiliency recommender is further configured to use the SAN graph model to rank each final candidate resiliency-problem solution in the set of resiliency-problem solutions. Ranking each final candidate resiliency-problem solution includes assigning to each final candidate resiliency-problem solution one of a plurality of ranking tiers. In some embodiments of the invention, assigning to each final candidate resiliency-problem solution one of the plurality of ranking tiers is based at least in part on a set of ranking criteria. In some embodiments of the invention, the set of ranking criteria includes a set of user-determined ranking criteria.

In embodiments of the invention where the candidate final resiliency-problem solutions include a set of final candidate switches in the SAN, the ranking operation is operable to use the SAN graph model to rank the final candidate switches that could be connected to the problematic resource(s) (e.g., host computer and/or storage areas) to solve the redundancy problem. In some embodiments of the invention, the multiple final candidate ranking or scoring tiers/levels consider the placement of resources (e.g., switches) as well as any other attributes such as storage connections, age of firmware, and the like. In some embodiments of the invention, each final candidate switch has three ranking tier scores computed for it, with each one having a number between zero (0) and one hundred (100) where a high score indicates that the final candidate switch is preferable.

In embodiments of the invention, the plurality of ranking tiers include a Scoring Tier1, a Scoring Tier2, and a Scoring Tier3, each of which has its own ranking criteria. The ranking criteria of Scoring Tier' can be based on the percentage of the problematic SAN component's connections to corresponding resources. Where the SAN component is a host computer, the corresponding resources are storage areas. Where the SAN component is a storage area, the corresponding resources are host computers. The ranking criteria of Scoring Tier2 can be based on whether or not the final candidate switch and the problematic SAN component node have access to each other (according to any zoning/permissions set up by the user), and can be further based on whether or not the candidate final switch is in the edge tier (optimal for a problematic host), the core tier (optimal for a problematic storage system), or neither. The ranking criteria of Scoring Tier3 can be based on the average minimum number of "hops" from the final candidate switch to the problematic SAN component's storage connections or host connections, the number of extraneous storage nodes (or extraneous host nodes) the candidate final switch is connected to, the age of the candidate final switch's firmware, the age of the candidate final switch itself, and the approximate distance between the candidate final switch and the problematic SAN component node. In embodiments of the invention, Scoring Tier2 is considered when comparing candidate final switches if their Scoring Tier1 scores are substantially the same, and Scoring Tier3 is only considered if both their Scoring Tier1 and Scoring Tier2 scores are substantially the same. In some embodiments of the invention, the plurality of ranking criteria can be configured to include a set of user-determined ranking criteria.

Turning now to a more detailed description of various embodiments of the invention, FIG. 1 depicts a simplified block diagram illustrating a data center system 100 operable to implement aspects of the invention. The data center system 100 can include any of the features and functionality of a data center previously described herein. In addition to the previously described data center features and functionality, the data center system 100 includes a SAN 110 and a resiliency recommender 120 in accordance with embodiments of the invention. A cloud computing system 50 is in wired or wireless electronic communication with the system 100. The cloud computing system 50 can supplement, support or replace some or all of the functionality (in any combination) of the system 100, including specifically the resiliency recommender 120. Additionally, some or all of the functionality of the system 100, including specifically the resiliency recommender 120, can be implemented as a node of the cloud computing system 50. Additional details of cloud computing functionality that can be used in connection with aspects of the invention are depicted by the computing environment 1600 shown in FIG. 16 and described in greater detail subsequently herein.

In a conventional configuration, the SAN 110 includes host computers attached to a various "fabrics" of switches, and the switches are attached to backend storage areas. In order to maintain and/or provide network resiliency, the resiliency recommender 120 performs automatic and dynamic network analysis operations that assist with ensuring that the fabrics of switches are provided with "redundancy," which means the fabrics of switches are configured and arranged such that multiple independent data traffic paths are provided from a given host computer through the switches to a backend storage area(s) associated with or assigned to the given host computer. A condition known as "single point failure" occurs when, instead of the fabrics of switches providing multiple independent data traffic paths from a given host computer through the switches to a backend storage area(s), the fabrics of switches do not provide multiple independent switch paths from a given host computer through the switches to a backend storage area(s).

Figure 2A:
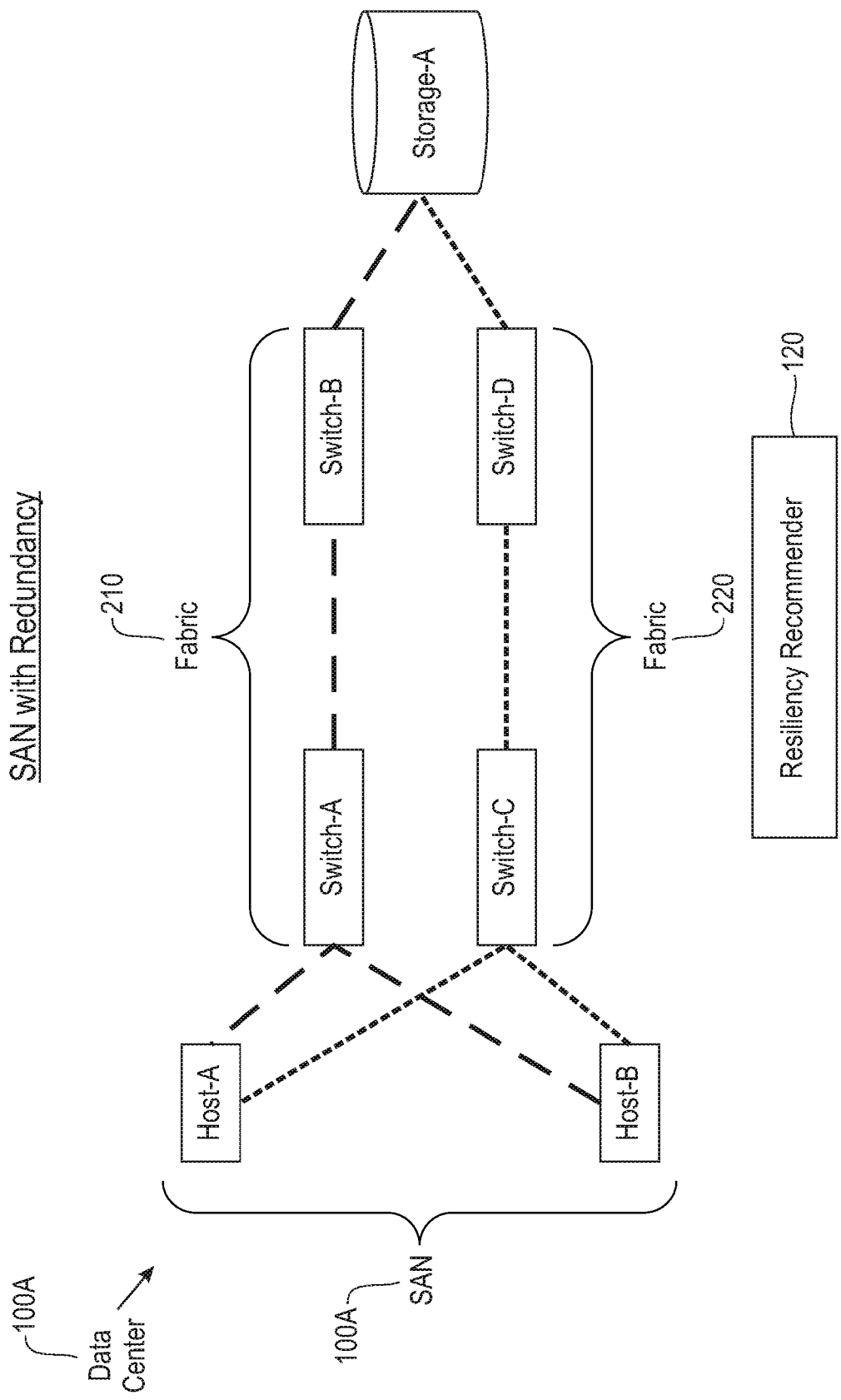
FIG. 2A depicts a simplified block diagram illustrating a system in accordance with embodiments of the invention.
Figure 2B:
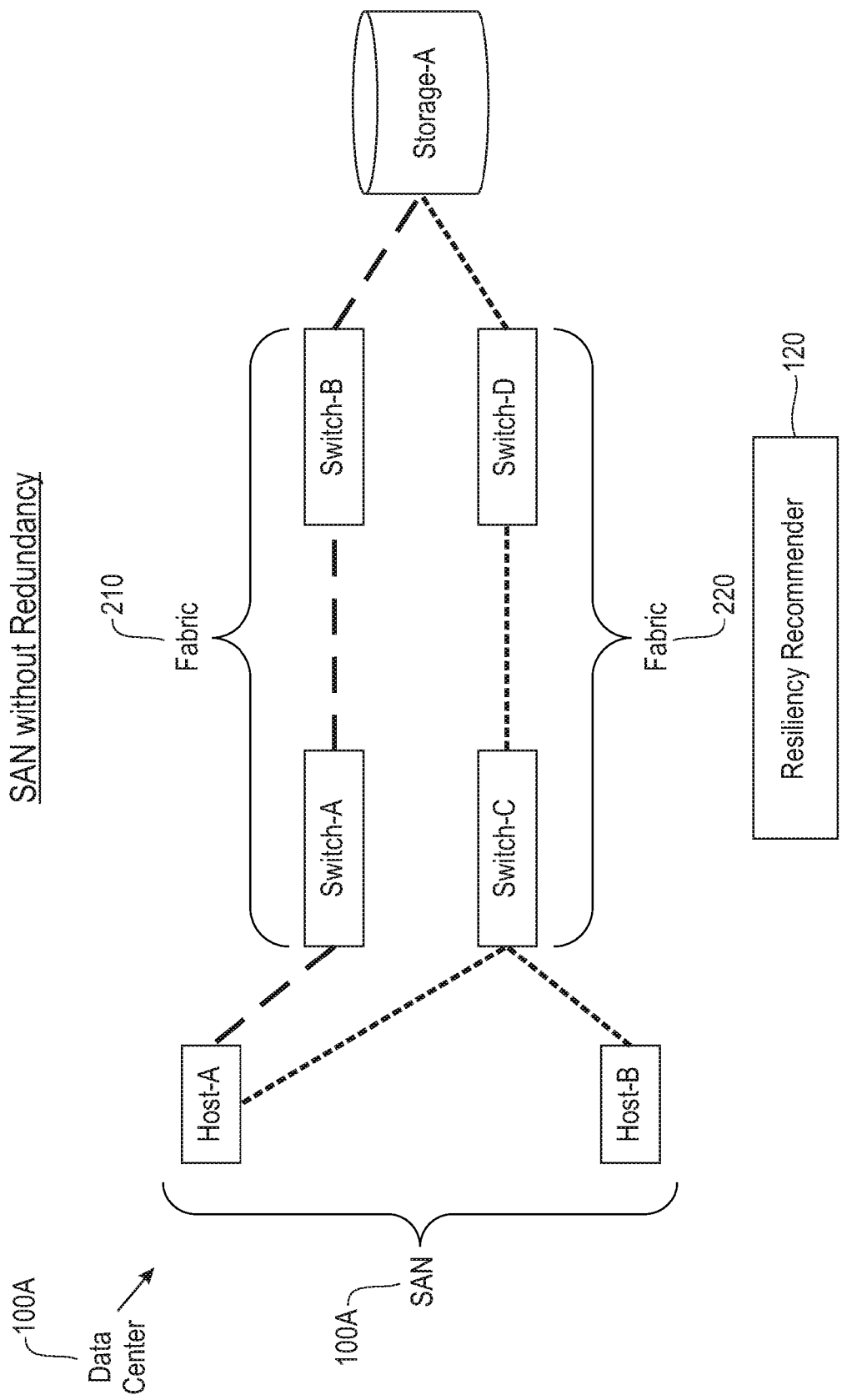
FIG. 2B depicts a simplified block diagram illustrating a system in accordance with embodiments of the invention.

FIG. 2A and FIG. 2B depict examples of how the data center system 100 (shown in FIG. 1) can be implemented as a data center system 100A having a SAN 100A and the resiliency recommender 120. As shown in both FIG. 2A and FIG. 2B, the data center system 100A includes host computers identified as Host-A and Host-B; a first switch fabric 210 formed from Switch-A and Switch-B; a second switch fabric 220 formed from Switch-C and Switch-D; and one or more storage areas represented as Storage-A.

In FIG. 2A, the SAN 100A is configured to provide redundancy for Host-A because Host-A has two independent paths to exchange data traffic with Storage-A. Host-A is coupled through Switch-A to Switch-C. The connection from Host-A to Switch-A provides Host-A with a first independent data traffic path through fabric 210 to Storage-A. The fabric 210 is formed from Switch-A and Switch-B. The connection from Host-A to Switch-C provides Host-A with a second independent data traffic path (i.e., a data traffic path that is independent from the first data traffic path) through the fabric 220 to Storage A. The fabric 220 is formed from Switch-C and Switch-D. As shown in FIG. 2A, the SAN 100A is configured to also provide redundancy for Host-B because Host-B has two independent paths to exchange data traffic with Storage-A. Host-B is coupled, independently, to Switch-C and Switch-A. The connection from Host-B to Switch-C provides Host-B with a first independent data traffic path through fabric 220 to Storage-A. The fabric 220 is formed from Switch-C and Switch-D. The connection from Host-B to Switch-A provides Host-B with a second independent data traffic path (i.e., independent from the first data traffic path) through fabric 210 to Storage-A. The fabric 210 is formed from Switch-A and Switch-B.

FIG. 2B depicts the data center system 100A, which is identical to the data center system 100A shown in FIG. 2A, except the redundancy depicted in FIG. 2A has been compromised for any of the reasons previously recited herein (e.g., a switch fails or the original redundant configuration was changed in a manner that inadvertently introduced the single point failure condition). Due to the compromise in redundancy, in the data center system 100A shown in FIG. 2B, the connection between Host-B and fabric 210 (i.e., at Switch-A) has been interrupted, which has resulted in a single-point failure condition for Host-B because Host-B now has only one data traffic path (through fabric 220) for reaching Storage-A. Accordingly, if for any reason any part of the data traffic path through fabric 220 fails, Host-B will no longer be in communication with Storage-A.

Due to the complexity and scale of the data center systems 100, 100A (shown in FIGS. 1, 2A, 2B), as well as the extremely fast performance expectations for data center operation, manually identifying resiliency problems in the data center system 100, and particularly in the SANs 110, 110A, is not feasible. Furthermore, identifying optimal solutions to resiliency problems in the SANs 110, 110A is similarly complicated, as there can be dozens of fixes that all technically work. Additionally, some resiliency fixes will innately be better than others, for example connecting a SAN host to a switch that does not connect to the SAN host's initial storage connections is not as optimal as connecting the SAN host to a switch that does connect to the SAN host's initial storage connections.

In accordance with embodiments of the invention, the resiliency recommender 120 is operable to provide systematic, fast, and reliable methodologies that move beyond known ad hoc, a priori methods of identifying resiliency/redundancy problems in a data center network to automatically, dynamically, and reliably identify and prioritize potential solutions to identified resiliency/redundancy problems. In embodiments of the invention, the resiliency recommender 120 is operable to automatically and dynamically identify a lack of resiliency in the data center systems 100, 100A, and particularly in the SANs 110, 110A of the data center systems 100, 100A (e.g., the single-point failure condition shown in FIG. 2B). Responsive to the identified lack of resiliency, the resiliency recommender 120 is further operable to recommend a network reconfiguration (i.e., a network "fix") to address the lack of resiliency.

Referring again to FIG. 1, in embodiments of the invention, the resiliency recommender 120 receives configuration data 122 associated with the SAN 110. In some embodiments of the invention, the configuration data 122 is information about the configuration of the SAN 110 gathered using known network scanning systems operable to automatically and dynamically scan the components of the SAN 110 according to a predetermined schedule in order to pull the functionality, connectivity, and other configuration information of the various components that make up the SAN 110. In some embodiments of the invention, the information about the configuration of the SAN 110 can be gathered at any stage, including during an initial SAN design, during SAN testing, during normal in-service SAN operation, in connection with SAN configuration updates/changes, and during any user-selected circumstance. In embodiments of the invention, the network scanning system used to generate the configuration data 122 can be separate from or incorporated within the resiliency recommender 120. In embodiments of the invention, the resiliency recommender 120 is operable to use the configuration data 122 to automatically, dynamically, and reliably perform analyses that identify network resiliency problems 124 in the SAN 110 (e.g., the single-point failure condition shown in FIG. 2B), generate a proposed set of network resiliency solutions 126, and rank the identified proposed set of network resiliency solutions 126. The proposed set of network resiliency solutions are also referred to herein as a proposed set of final network resiliency solutions.

Figure 3:
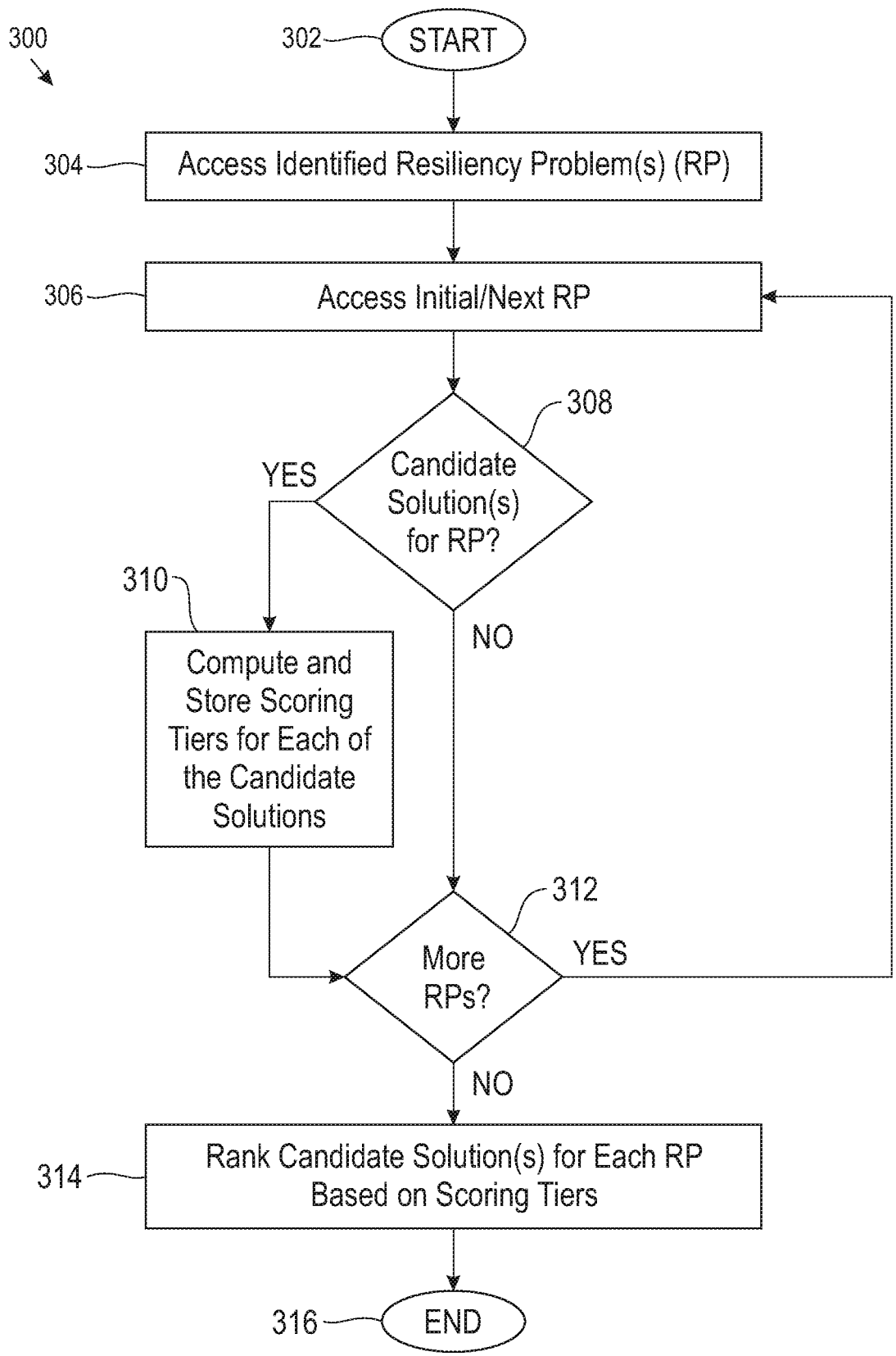
FIG. 3 depicts a flow diagram illustrating a computer-implemented method in accordance with embodiments of the invention.

FIG. 3 depicts a flow diagram illustrating a computer-implemented methodology 300 that can be performed by the resiliency recommender 120 (shown in FIGS. 1, 2A, and 2B) to automatically, dynamically, and reliably perform analyses that identify network resiliency problems 124 in the SAN 110 (e.g., the single-point failure condition shown in FIG. 2B), generate a proposed set of network resiliency solutions 126, and rank the identified network resiliency solutions 126 in accordance with embodiments of the invention. As shown in FIG. 3, the methodology 300 begins at block 300 and moves to block 302 to access redundancy problems identified for the SAN 100, 100A (shown in FIGS. 1, 2A, and 2B). In embodiments of the invention, the resiliency recommender 120 identifies the resiliency problems (e.g., the single-point failure condition shown in FIG. 2B) by performing an analysis of the configuration data 122 using any suitable data analysis mechanism. At block 306, the methodology 300 accesses an initial or next resiliency problem for subsequent analysis.

At decision block 308 the methodology 300 generates a set of candidate solutions for the resiliency problem selected at block 306 is identified using any suitable network analysis technique. For example, in the simplified single-point failure condition shown in FIG. 2B, a candidate solution generated at decision block 308 could be to establish or reestablish a data traffic path from Host-B through fabric 210 by connecting or reconnecting Host-B to Switch-A. FIG. 2B is simplified representation of a single-point failure condition having a simple candidate solution. However, in a real-world implementation of the data center system 100A and the SAN 110A, multiple candidate solution would be generated and evaluated. In some embodiments of the invention, the number and complexity of candidate solutions generated at decision block 308 is reduced by applying candidate solution criteria that establish and enforce minimum qualifications for an identified resiliency problem solution to be considered a candidate resiliency problem solution.

If decision block 308 generates candidate resiliency problem solutions, the result of the inquiry at decision block 308 is yes, and the methodology 300 moves to block 310 where the resiliency recommender 120 evaluates each candidate resiliency problem solution and provides a score for each candidate resiliency problem solution using any suitable scoring methodology. In some embodiments of the invention, the scoring methodology includes a tiered scoring methodology in which each tier defines a set of criteria) for that tier, where higher tiers set tier criteria that define a superior resiliency solution over lower tier criteria. If decision block 308 does not generate candidate resiliency problem solutions, the result of the inquiry at decision block 308 is no, and the methodology 300 moves to decision block 312 where the resiliency recommender 120 determines whether there are additional resiliency problems that need to be evaluated. If the result of the inquiry at decision block 312 is yes, the methodology 300 returns to block 306 to access and evaluate a next resiliency problem. If the result of the inquiry at decision block 312 is no, the methodology 300 moves to block 314 and the resiliency recommender 120 ranks the scored candidate resiliency solutions generated at block 310 for each resiliency problem. From block 314, the methodology 300 moves to block 316 and ends. Similarly, from block 310, the methodology 300 moves to decision block 312 where the resiliency recommender 120 determines whether there are additional resiliency problems that need to be evaluated. If the result of the inquiry at decision block 312 is yes, the methodology 300 returns to block 306 to access and evaluate a next resiliency problem. If the result of the inquiry at decision block 312 is no, the methodology 300 moves to block 314 and the resiliency recommender 120 ranks the scored candidate resiliency solutions generated at block 310 for each resiliency problem. From block 314, the methodology 300 moves to block 316 and ends.

Figure 4:
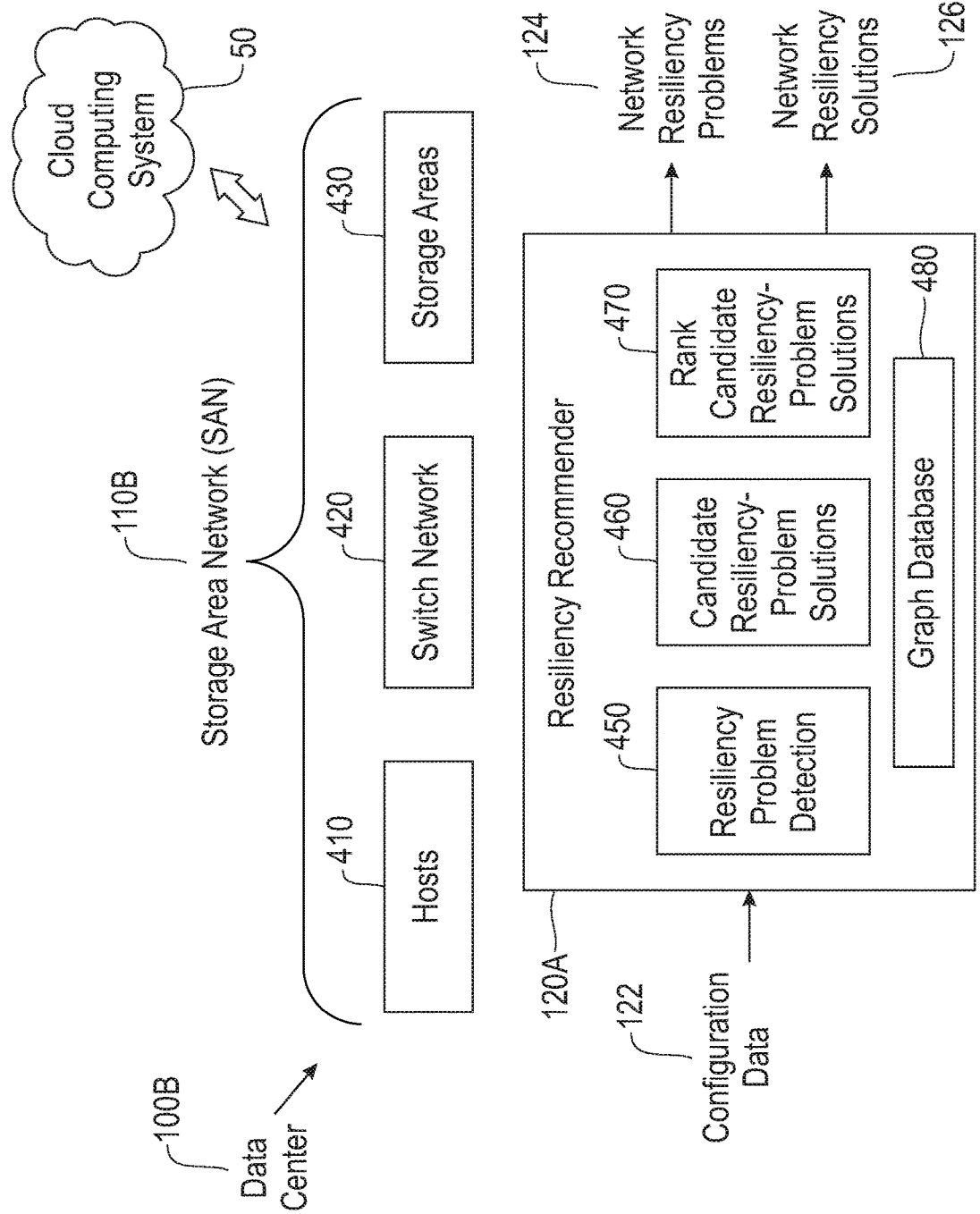
FIG. 4 depicts a simplified block diagram illustrating a system in accordance with embodiments of the invention.

FIG. 4 depicts a simplified block diagram illustrating a data center system 100B operable to implement aspects of the invention. The data center system 100B is a more detailed example of how the data center systems 100, 100A (shown in FIGS. 1, 2A, 2B) can be implemented in accordance with embodiments of the invention. Similar to the systems 100, 100A, the data center system 100B can include any of the features and functionality of a data center previously described herein. In addition to the previously described data center features and functionality, the data center system 100B includes a SAN 110B and a resiliency recommender 120A in accordance with embodiments of the invention. A cloud computing system 50 is in wired or wireless electronic communication with the system 100. The cloud computing system 50 can supplement, support or replace some or all of the functionality (in any combination) of the system 100B, including specifically the resiliency recommender 120A. Additionally, some or all of the functionality of the system 100B, including specifically the resiliency recommender 120A, can be implemented as a node of the cloud computing system 50. Additional details of cloud computing functionality that can be used in connection with aspects of the invention are depicted by the computing environment 1600 shown in FIG. 16 and described in greater detail subsequently herein.

In the data center system 100B, the SAN 110B is configured to include hosts 410 (corresponding to Host-A and Host-B shown in FIGS. 2A and 2B), a switch network 420 (corresponding to fabrics 210, 220 shown in FIGS. 2A and 2B), and storage areas 430 (corresponding to Storage-A shown in FIGS. 2A and 2B). Like the resiliency recommender 120 (shown in FIGS. 1, 2A, and 2B), the resiliency recommender 120A is configured to perform automatic and dynamic network analysis operations that assist with ensuring that the switch network 420 is provided with "redundancy," which means the fabrics of the switch network 420 are configured and arranged such that multiple independent data traffic paths are provided from any one of the hosts 410 through the switch network 420 to the backend storage area(s) 430 associated with or assigned to one of the hosts 410. Similar to the SAN 100A (shown in FIG. 2A, 2B), the SAN 100B can experience the previously described condition known as "single point failure." In embodiments of the invention, the resiliency recommender 120A is operable to automatically and dynamically identify a lack of resiliency in the data center systems 100, 100A, 100B and particularly in the SANs 110, 110A, 100B of the data center systems 100, 100A (e.g., the single-point failure condition shown in FIG. 2A). Responsive to the identified lack of resiliency, the resiliency recommender 120 is further operable to recommend a network reconfiguration (i.e., a network "fix") to address the lack of resiliency.

In embodiments of the invention, the resiliency recommender 120A receives configuration data 122 associated with the SAN 110B. In some embodiments of the invention, the configuration data 122 is information about the configuration of the SAN 110B gathered using known network scanning systems operable to automatically and dynamically scan the components of the SAN 110B according to a predetermined schedule in order to pull the functionality, connectivity, and other configuration information of the various components that make up the SAN 110B. In some embodiments of the invention, the information about the configuration of the SAN 110B can be gathered at any stage, including during an initial SAN design, during SAN testing, during normal in-service SAN operation, in connection with SAN configuration updates/changes, and during any user-selected circumstance. In embodiments of the invention, the network scanning system used to generate the configuration data 122 can be separate from or incorporated within the resiliency recommender 120A. In embodiments of the invention, the resiliency recommender 120A is operable to use the configuration data 122 to automatically, dynamically, and reliably perform analyses that identify network resiliency problems 124 in the SAN 110A (e.g., the single-point failure condition shown in FIG. 2B), generate a proposed set of network resiliency solutions 126, and rank the identified network resiliency solutions 126.

In embodiments of the invention, the resiliency recommender 120A includes a resiliency problem detection module 450, a candidate resiliency-problem solutions module 460, and a rank candidate resiliency-problem solutions module 470, configured and arranged as shown. In some embodiments of the invention, the resiliency recommender 120A further includes a graph model, which can be implemented as a graph database 480. In accordance with embodiments of the invention, the analyses that identify network resiliency problems 124 in the SAN 110A (e.g., the single-point failure condition shown in FIG. 2B), generate the proposed set of network resiliency solutions 126, and rank the identified network resiliency solutions 126 includes analyses performed using the resiliency problem detection module 450, the candidate resiliency-problem solutions module 460, and the rank candidate resiliency-problem solutions module 470. In accordance with embodiments of the invention, the analyses that identify network resiliency problems 124 in the SAN 110A (e.g., the single-point failure condition shown in FIG. 2B), generate the proposed set of network resiliency solutions 126, and rank the identified network resiliency solutions 126 includes analyses performed using the resiliency problem detection module 450, the candidate resiliency-problem solutions module 460, the rank candidate resiliency-problem solutions module 470, and the graph model implemented, in some embodiments, as the graph database 480.

In embodiments of the invention, the resiliency recommender 120A is operable to use the configuration data 122 to generate a model of a portion of the data center system 100B that is under analysis. In the embodiment depicted in FIG. 4, the portion of the data center system 100B that is under analysis is the SAN 110B. In some embodiments of the invention, the model of the SAN 110B is represented as a graph model configured to represent through its nodes and edges the full configuration of the SAN 110B, including components, connections, characteristics, and functionality of the SAN 110B.

Figure 5:
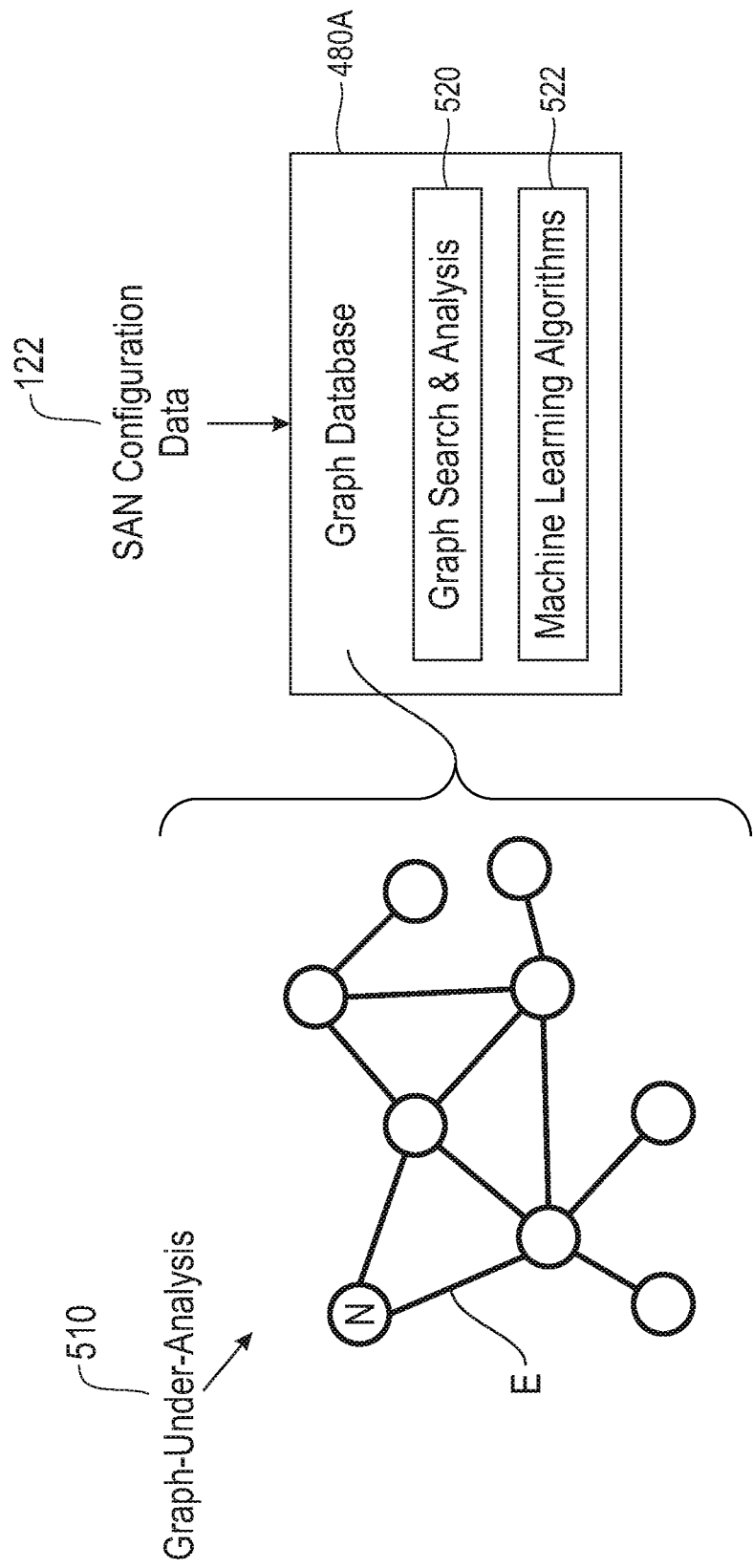
FIG. 5 depicts a simplified block diagram illustrating portions of a system in accordance with embodiments of the invention.

FIG. 5 depicts an example of how the configuration data 122 can be represented as a graph-under-analysis (GUA) 410 using the graph database 480A having a graph search & analysis module 520 operable to perform various graph search and analysis operations in accordance with aspects of the invention. In general, graphs are mathematical structures used to model pairwise relations between objects, which are generally represented by an "adjacency matrix," an example of which is shown as the GUA 510. The GUA 510 in this context is made up of nodes (N) (also called vertices or points) that are connected by edges (E) (also called links or lines). The adjacency matrix includes a square matrix whose elements indicate whether pairs of vertices are connected or not in the graph. A distinction is made between undirected graphs in which edges link two vertices symmetrically and directed graphs in which edges link two vertices asymmetrically. Graphs can be used to model many types of relations and processes in physical, biological, social, and information systems. The term network can be defined as a graph in which attributes (e.g., features, attributes, components, connections, and the like) are associated with the vertices and edges.

Graphs are a meaningful and understandable representation of datasets organized as a network/system, and the edge/node relationships in graphs can only be analyzed using a specific subset of mathematics, statistics, and machine learning techniques. In some embodiments of the invention, in order to expand the machine learning tools that can be used to analyze the GUA 510, the GUA 510 can be translated to a vector space known as embeddings or graph embeddings. Graph embeddings are the transformation of various graph properties to a vector or a set of vectors. In general, computer-based analysis operations performed on vectors is simpler and faster than comparable analysis operations performed directly on graphs. The vector space captured or encoded in a graph embedding should include the graph topology, vertex-to-vertex relationship, and other relevant information about the graph, its subgraphs, and its vertices.

The configuration data 122 can be gathered and ingested into a graph model using the graph database 480, 480A. In embodiments of the invention, the graph database 480, 480A can be implemented as a software implementation of a model of the graph 510 graph, consisting of nodes (N), edges (E) and properties of the nodes and edges. The graph database 480A includes graph search and analysis 520 functionality operable to implement a number of efficient operations to create a graph structure model and query for various conditions in the graph or transform subsections of the graph. The GUA 510 models the SAN 110B (shown in FIG. 4) a graph of nodes (N) representing the hosts 410, the switch network 420, and storage areas 430); edges (connections of host-to-switch, switch-to-switch and switch-to-storage); node properties such as switch firmware level or available connections count; and edge properties such as connection speed. When the physical elements and configurations of the SAN 110B are ingested into the graph database 480A, operations performed by the resiliency recommender 120A (e.g., the resiliency problem detection module 450, the candidate resiliency-problem solutions module 460, the rank candidate resiliency-problem solutions 470) can be facilitated by use of the various graph database available operators, which are represented by the graph search and analysis 520. The graph database 480A enables scaling of the various embodiments of the invention, including specifically the resiliency recommender 120A to large real-world sized SANS having hundreds of hosts, switches and storage components, along with thousands of connections and potential connections.

In embodiments of the invention, the resiliency recommender 120A is operable to use the graph model of the SAN 110B to automatically and dynamically perform analyses that identify resiliency problems in the graph model of the SAN 110B, generate a proposed set of the solutions to the identified resiliency problems, and rank the proposed set of solution to the identified resiliency problems. In embodiments of the invention, the resiliency problem detection module 450 analyzes the graph model of the SAN 110B to identify resiliency problems in the graph model of the SAN 110B, which correspond to actual resiliency problems in the SAN 110B. The graph model of the SAN 110B applying the candidate resiliency-problem solutions analysis 460 each of the resiliency problems in the set of resiliency problems to generate multiple sets of resiliency-problem solutions (i.e., a set of resiliency-problem solutions for each identified resiliency problem). In some embodiments of the invention, the resiliency-problem solution analysis 460 analyzes a set of initial candidate resiliency-problem solutions to generate a set of final candidate resiliency-problem solutions (e.g., candidate switches that could be connected to the problematic SAN component in order to fix it) according to a set of final candidate criteria. In embodiments of the invention where the resiliency problem is a redundancy problem, the set of final candidate criteria include a set of requirements such as the candidate resiliency-problem solution being in a different fabric (e.g., fabric 210 is different from fabric 220 shown in FIG. 2A) than a SAN component's original switch connection, and/or the candidate resiliency-problem solution connecting the SAN component being connected to storage.

In embodiments of the invention, the resiliency recommender 120A is further configured to use the graph model of the SAN 110B to rank each final candidate resiliency-problem solution (e.g., network resiliency solutions 126) in the set of resiliency-problem solutions. Ranking each final candidate resiliency-problem solution includes assigning to each final candidate resiliency-problem solution 126 one of a plurality of ranking tiers. In some embodiments of the invention, assigning to each final candidate resiliency-problem solution one of the plurality of ranking tiers is based at least in part on a set of ranking criteria. In some embodiments of the invention, the set of ranking criteria includes a set of user-determined ranking criteria.

In embodiments of the invention where the cant final resiliency-problem solutions include a set of final candidate switches from among the switch network 420 in the SAN 110B, the ranking operation 470 is operable to use the graph model of the SAN 110B to rank the final candidate switches that could be connected to the problematic resource(s) (e.g., hosts 410 and/or storage areas 430) to solve the redundancy problem. In some embodiments of the invention, the multiple final candidate ranking or scoring tiers/levels consider the placement of resources (e.g., switches) as well as any other attributes such as storage connections, age of firmware, and the like. In some embodiments of the invention, each final candidate switch has three ranking tier scores computed for it, with each one having a number between zero (0) and one hundred (100) where a high score indicates that the final candidate switch is preferable.

In embodiments of the invention, the plurality of ranking tiers include a Scoring Tier1, a Scoring Tier2, and a Scoring Tier3, each of which has its own ranking criteria. The ranking criteria of Scoring Tier1 can be based on the percentage of the problematic components of the SAN 110B that are connected to corresponding resources. Where the SAN component is a host computer, the corresponding resources are storage areas. Where the SAN component is a storage area, the corresponding resources are host computers. The ranking criteria of Scoring Tier2 can be based on whether or not the final candidate switch and the problematic SAN component node have access to each other (according to any zoning/permissions set up by the user), and can be further based on whether or not the candidate final switch is in the edge tier (optimal for a problematic host), the core tier (optimal for a problematic storage system), or neither. The ranking criteria of Scoring Tier3 can be based on the average minimum number of "hops" from the final candidate switch to the problematic SAN component's storage connections or host connections, the number of extraneous storage nodes (or extraneous host nodes) the candidate final switch is connected to, the age of the candidate final switch's firmware, the age of the candidate final switch itself, and the approximate distance between the candidate final switch and the problematic SAN component node. In embodiments of the invention, Scoring Tier2 is considered when comparing candidate final switches if their Scoring Tier1 scores are substantially the same, and Scoring Tier3 is only considered if both their Scoring Tier1 and Scoring Tier2 scores are substantially the same. In some embodiments of the invention, the plurality of ranking criteria can be configured to include a set of user-determined ranking criteria.

Figure 6:
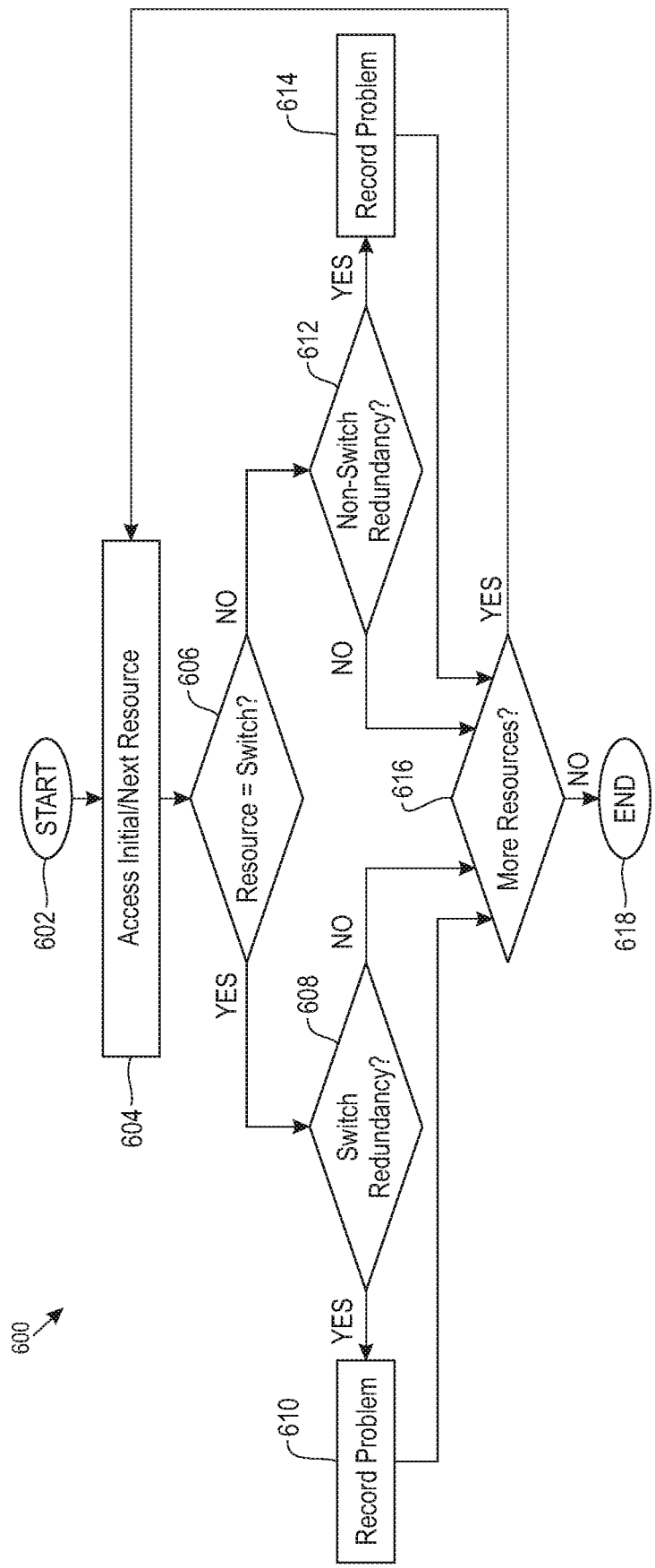
FIG. 6 depicts a flow diagram illustrating a computer-implemented method in accordance with embodiments of the invention.

FIG. 6 depicts a flow diagram illustrating a methodology 600 in accordance with embodiments of the invention. In embodiments of the invention, the methodology 600 can be performed by the resiliency problem detection module 450 (shown in FIG. 4) of the resiliency recommender 120A (shown in FIG. 4). In some embodiments of the invention, the graph search and analysis functionality 520 (shown in FIG. 5) of the graph database 480A (shown in FIG. 5) can, in effect, be programmed or otherwise configured to perform the methodology 600 on the GUA 510 (shown in FIG. 5) as a proxy for any of the SAN implementations (e.g., SAN 100, 100A, 100B, 100C) described herein. In embodiments of the invention where the GUA 510 has been vectorized and embedded, the machine learning algorithms 522 (shown in FIG. 5) of the graph database 480A can, in effect, be trained or otherwise configured to perform some or all of the operations in the methodology 600. In some embodiments of the invention, the machine learning algorithms 522 can work in cooperation with the graph search and analysis module 520 to perform the methodology 600.

As shown in FIG. 6, the methodology 600 begins at block 602 then moves to block 604 to access the initial/next resource (e.g., hosts 410, switch network 420, storage areas 430) that is represented in the GUA 510 (shown in FIG. 5). The methodology 600 moves to decision block 606 to determine whether the resource accessed at block 604 is a switch (e.g., a switch in the switch network 420 shown in FIG. 4). If the answer to the inquiry at decision block 606 is yes, the methodology 600 moves to decision block 608 to determine whether there are any redundancy issues associated with the switch. If the answer to the inquiry at decision block 608 is yes, the methodology 600 moves to block 610 and records details about the nature of the redundancy problem, including details about the switch, the connections to and from the switch, other resources that participate in or contribute to the redundancy problem, and any other information that can be used by other processes to identify and rank potential solutions to the redundancy problem identified at decision block 608. For example, the information recorded at block 610 can include information that suggests the switch associated with the redundancy problem may not be operating properly, which can be used by other processes to determine that a possible solution to the redundancy problem could be to replace the switch or reroute the relevant data traffic to bypass the switch and the redundancy problem. From block 610, the methodology 600 moves to decision block 616 to determine whether there are any more resources to evaluate. If the answer to the inquiry at decision block 616 is yes, the methodology 600 returns to block 604 to access the next resource for evaluation and perform another iteration of the methodology 600. If the answer to the inquiry at decision block 616 is no, the methodology 600 moves to block 618 and ends. Returning to decision block 608, if the answer to the inquiry at decision block 608 is no, the methodology 600 moves to decision block 616 to determine whether there are any more resources to evaluate. If the answer to the inquiry at decision block 616 is yes, the methodology 600 returns to block 604 to access the next resource for evaluation and perform another iteration of the methodology 600. If the answer to the inquiry at decision block 616 is no, the methodology 600 moves to block 618 and ends.

Returning to decision block 606, if the answer to the inquiry at decision block 606 is no, the methodology 600 moves to decision block 612 to determine whether there are any non-switch redundancy issues associated with the resource. If the answer to the inquiry at decision block 612 is yes, the methodology 600 moves to block 614 and records details about the nature of the redundancy problem, including details about the non-switch resource, the connections to and from the non-switch resource, other resources that participate in or contribute to the non-switch redundancy problem, and any other information that can be used by other processes to identify and rank potential solutions to the non-switch redundancy problem identified at decision block 612. For example, the information recorded at block 610 can include information that suggests that a connection to the non-switch resource associated with the redundancy problem may not be operating properly (e.g., the single point failure condition shown in FIG. 2B), which can be used by other processes to determine that a possible solution to the redundancy problem could be to replace the defective connection or provide a different connection point to bypass the non-switch redundancy problem. From block 614, the methodology 600 moves to decision block 616 to determine whether there are any more resources to evaluate. If the answer to the inquiry at decision block 616 is yes, the methodology 600 returns to block 604 to access the next resource for evaluation and perform another iteration of the methodology 600. If the answer to the inquiry at decision block 616 is no, the methodology 600 moves to block 618 and ends. Returning to decision block 612, if the answer to the inquiry at decision block 612 is no, the methodology 600 moves to decision block 616 to determine whether there are any more resources to evaluate. If the answer to the inquiry at decision block 616 is yes, the methodology 600 returns to block 604 to access the next resource for evaluation and perform another iteration of the methodology 600. If the answer to the inquiry at decision block 616 is no, the methodology 600 moves to block 618 and ends.

Figure 7:
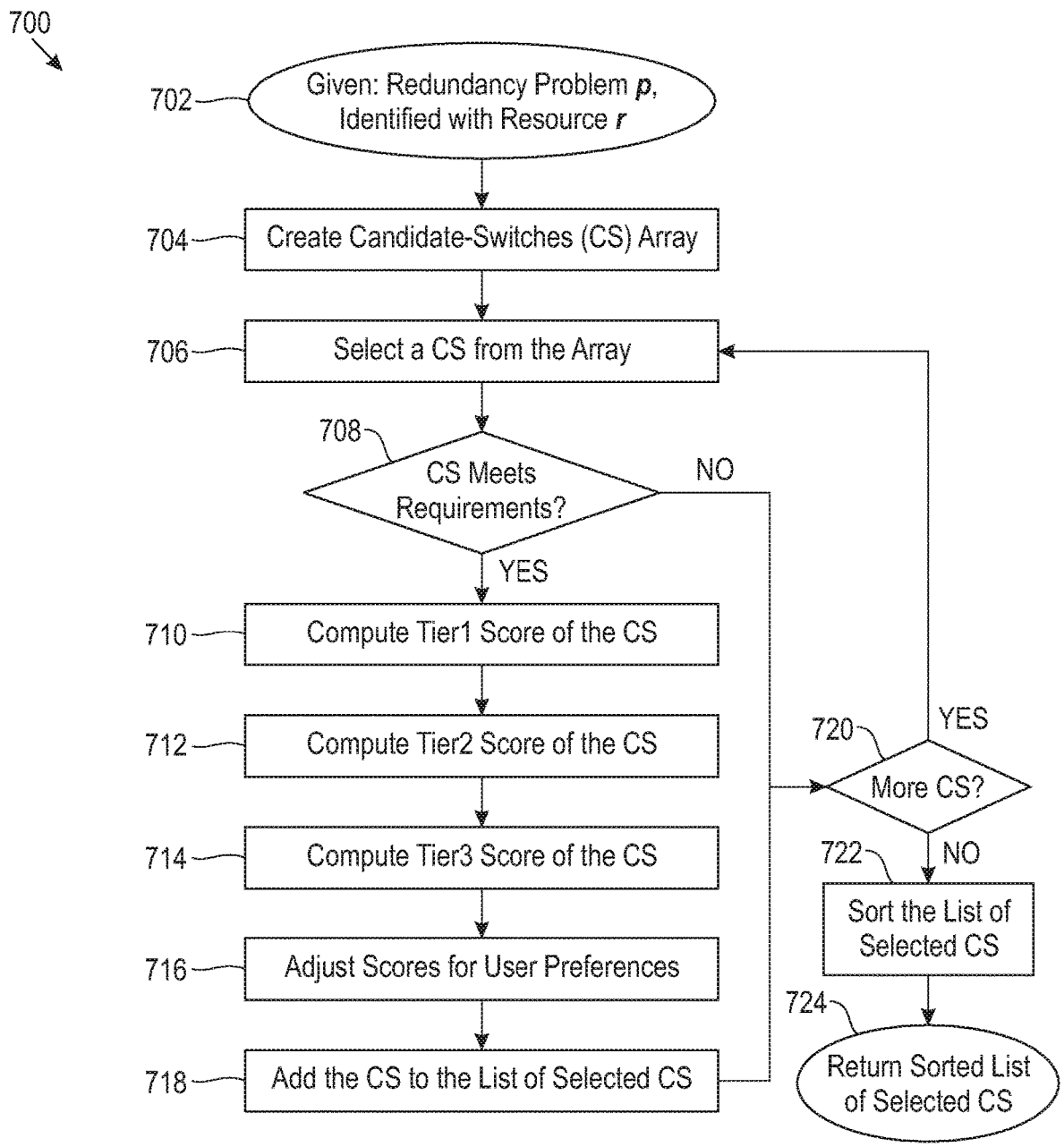
FIG. 7 depicts a flow diagram illustrating a computer-implemented method in accordance with embodiments of the invention.

FIG. 7 depicts a flow diagram illustrating a methodology 700 in accordance with embodiments of the invention. In embodiments of the invention, the methodology 700 can be performed by the candidate resiliency-problem solutions module 460 (shown in FIG. 4) (blocks 704 through 708) and the rank candidate resiliency-problem solutions module 470 of the resiliency recommender 120A (shown in FIG. 4) (blocks 710 through 718). In some embodiments of the invention, the graph search and analysis functionality 520 (shown in FIG. 5) of the graph database 480A (shown in FIG. 5) can, in effect, be programmed or otherwise configured to perform the methodology 700 on the GUA 510 (shown in FIG. 5) as a proxy for any of the SAN implementations (e.g., SAN 100, 100A, 100B, 100C) described herein. In embodiments of the invention where the GUA 510 has been vectorized and embedded, the machine learning algorithms 522 (shown in FIG. 5) of the graph database 480A can, in effect, be trained or otherwise configured to perform some or all of the operations in the methodology 700. In some embodiments, the machine learning algorithms 522 can work in cooperation with the graph search and analysis module 520 to perform the methodology 700.

Figure 8:
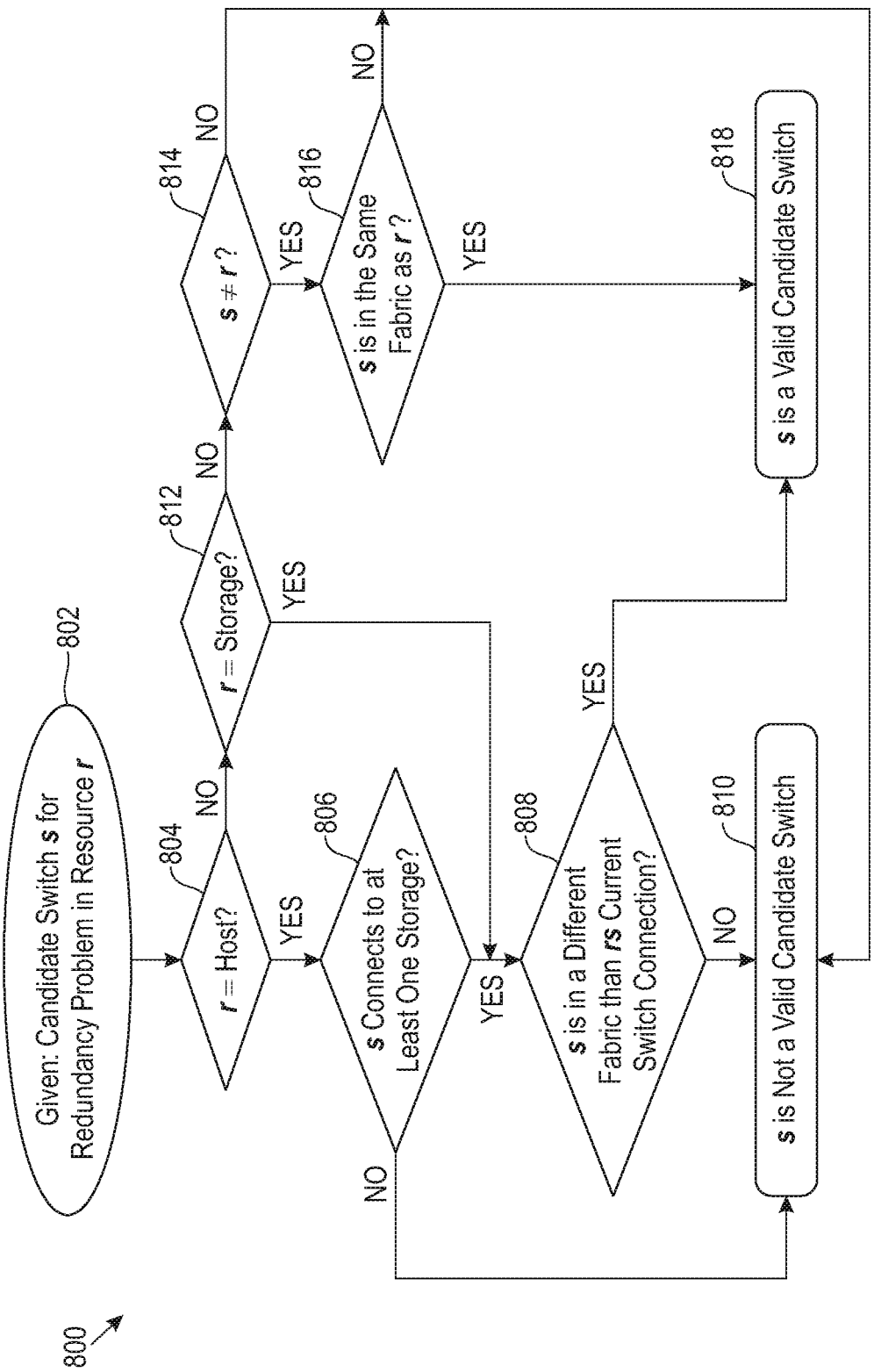
FIG. 8 depicts a flow diagram illustrating a computer-implemented method in accordance with embodiments of the invention.

As shown in FIG. 7, the methodology 700 begins at block 702 where methodology 600 has been used to identify redundancy problems (p) associated with resources (r). The methodology 700 moves to block 704 to perform a resiliency-problem solution analysis that is applied to each resiliency problem in the set of resiliency problems stored at blocks 610, 614 of the methodology 600 (shown in FIG. 6) to generate an initial set of resiliency-problem solutions. Block 704 then creates an array of initial candidate switches that can be used as part of the set of initial resiliency-problem solutions (e.g., candidate switches that could be connected to the problematic SAN component in order to fix it). The methodology 700 then moves to block 706 to select a switch from the initial candidate switch array for analysis. The methodology 700 moves to decision block 708 to apply a set of requirements to the initial candidate switch selected at block 706 to determine whether the initial candidate switch will be included among the final candidate switches. At decision block 708, the requirements include a set of final candidate criteria (i.e., criteria applied to the initial candidate switch to determine whether the initial candidate switch will be a final candidate switch). In embodiments of the invention where the resiliency problem is a redundancy problem, the set of final candidate criteria includes a set of requirements such as the candidate switch is in a different fabric than a SAN component's original switch connection (e.g., as shown in FIGS. 2A and 2B), and/or the candidate switch connecting the SAN component being connected to storage. A non-limiting example of how the requirements analysis performed at decision block 708 can be implemented is depicted in FIG. 8 as a methodology 800, which is described in greater detail subsequently herein.

If the answer to the inquiry at decision block 708 is yes (i.e., the initial candidate switch selected at block 708 meets the requirements for being among the final candidate switches), the methodology 700 moves, in sequence, through blocks 710 through 718 where block 710 through block 718 perform a tier-based ranking of the final candidate switches. At block 710, a Tier1 score is computed for the final candidate switch. At block 712, a Tier2 score is computed for the final candidate switch. At block 714, a Tier3 score is computed for the final candidate switch. At block 716, the scores computed at blocks 710, 712, and 714 are optionally adjusted to take into account user preferences. At block 718, the final candidate switch and its Tier1, Tier2, Tier3 scores are stored.

In some embodiments of the invention, the multiple final candidate ranking or scoring tiers/levels developed at blocks 710 through 716 consider the placement of resources (e.g., switches) as well as any other attributes such as storage connections, age of firmware, and the like. In some embodiments of the invention, the three ranking tier scores can be computed as a number between zero (0) and one hundred (100) where a high score indicates that the final candidate switch is preferable. In embodiments of the invention, Tier1, Tier2, and Tier3 each has its own ranking criteria. The ranking criteria of Tier1 can be based on the percentage of the problematic SAN component's connections to corresponding resources. Where the SAN component is a host computer, the corresponding resources are storage areas. Where the SAN component is a storage area, the corresponding resources are host computers. The ranking criteria of Tier2 can be based on whether or not the final candidate switch and the problematic SAN component node have access to each other (according to any zoning/permissions set up by the user), and can be further based on whether or not the candidate final switch is in the edge tier (optimal for a problematic host), the core tier (optimal for a problematic storage system), or neither. The ranking criteria of Tier3 can be based on the average minimum number of "hops" from the final candidate switch to the problematic SAN component's storage connections or host connections, the number of extraneous storage nodes (or extraneous host nodes) the candidate final switch is connected to, the age of the candidate final switch's firmware, the age of the candidate final switch itself, and the approximate distance between the candidate final switch and the problematic SAN component node. In embodiments of the invention, Tier2 is considered when comparing candidate final switches if their Tier1 scores are substantially the same, and Tier3 is only considered if both Tier1 and Tier2 scores are substantially the same. In some embodiments of the invention, the plurality of ranking criteria can be configured to include a set of user-determined ranking criteria.

From block 718, the methodology 700 moves to decision block 720 to determine whether there are any additional final candidate switches in the initial candidate switch array. If the answer to the inquiry at decision block 720 is yes, the methodology 700 moves to block 706 to select a next initial candidate switch for analysis and perform another iteration of the methodology 700. If the answer to the inquiry at decision block 720 is no, the methodology 700 moves to block 722 to sort the list of selected and ranked candidate switches. The methodology 700 then moves to block 724 to return the sorted list of selected and ranked candidate switches.

Returning to decision block 708, if the answer to the inquiry at decision block 708 is no, the methodology 700 moves to decision block 720 to determine whether there are any additional final candidate switches in the initial candidate switch array. If the answer to the inquiry at decision block 720 is yes, the methodology 700 moves to block 706 to select a next initial candidate switch for analysis and perform another iteration of the methodology 700. If the answer to the inquiry at decision block 720 is no, the methodology 700 moves to block 722 to sort the list of selected and ranked candidate switches. The methodology 700 then moves to block 724 to return the sorted list of selected and ranked candidate switches.

FIG. 8 depicts a flow diagram illustrating a methodology 700, which is a non-limiting example of how the requirements analysis performed at decision block 708 of the methodology 700 (shown in FIG. 7) can be implemented in accordance with aspects of the invention. As shown in FIG. 8, the methodology 800 begins at block 802. Block 802 reflects result of the operations performed at blocks 702 through 706 of the methodology 700 (shown in FIG. 7) to select an initial candidate switch s for addressing a redundancy problem in resource r. The methodology 800 moves to decision block 804 to determine whether r is a host (e.g., one of the hosts 410 shown in FIG. 4). If the answer to the inquiry at decision block 804 is yes, the methodology 800 moves to decision block 806 to determine whether the candidate switch s is connected to at least one storage area (e.g., one of the storage areas 430 shown in FIG. 4). If the answer to the inquire at decision block 806 is yes, the methodology 800 moves to decision block 808 to determine whether the candidate switch s is in a different fabric (e.g., either fabric 210 or fabric 220 shown in FIG. 2A or 2B) than the rs (i.e., resource-to-switch) current switch connection. If the answer to the inquiry at decision block 808 is yes, the methodology 800 moves to block 818 and determines that the candidate switch s is a valid candidate switch (i.e., a final candidate switch). If the answer to the inquiry at decision block 808 is no, the methodology 800 moves to block 810 and determines that the candidate switch s is not a valid candidate switch (i.e., a final candidate switch). Returning to decision block 806, if the answer to the inquiry at decision block 806 is no, the methodology 800 moves to block 810 and determines that the candidate switch s is not a valid candidate switch (i.e., a final candidate switch).

Returning to decision block 804, if the answer to the inquiry at decision block 804 is no, the methodology 800 moves to decision block 812 to determine whether the resource r is a storage (e.g., one of the storage areas 430 shown in FIG. 4). If the answer to the inquire at decision block 812 is yes, the methodology 800 moves to decision block 808 to determine whether the candidate switch s is in a different fabric (e.g., either fabric 210 or fabric 220 shown in FIG. 2A or 2B) than the rs (i.e., resource-to-switch) current switch connection. If the answer to the inquiry at decision block 808 is yes, the methodology 800 moves to block 818 and determines that the candidate switch s is a valid candidate switch (i.e., a final candidate switch). If the answer to the inquiry at decision block 808 is no, the methodology 800 moves to block 810 and determines that the candidate switch s is not a valid candidate switch (i.e., a final candidate switch). Returning to decision block 812, if the answer to the inquiry at decision block 812 is no, the methodology 800 moves to decision block 814 and determines whether s≠r. If the answer to the inquiry at decision block 814 is yes, the methodology 800 moves to decision block 816 to determine whether the candidate switch s is in the same fabric (e.g., either fabric 210 or fabric 220 shown in FIG. 2A or 2B) as r. If the answer to the inquire at decision block 816 is yes, the methodology 800 moves to block 818 and determines that the candidate switch s is a valid candidate switch (i.e., a final candidate switch). If the answer to the inquire at decision block 816 is no, the methodology 800 moves to moves to block 810 and determines that the candidate switch s is not a valid candidate switch (i.e., a final candidate switch). Returning to decision block 814, if the answer to the inquiry at decision block 814 is no, the methodology 800 moves to block 810 and determines that the candidate switch s is not a valid candidate switch (i.e., a final candidate switch).

Figure 9:
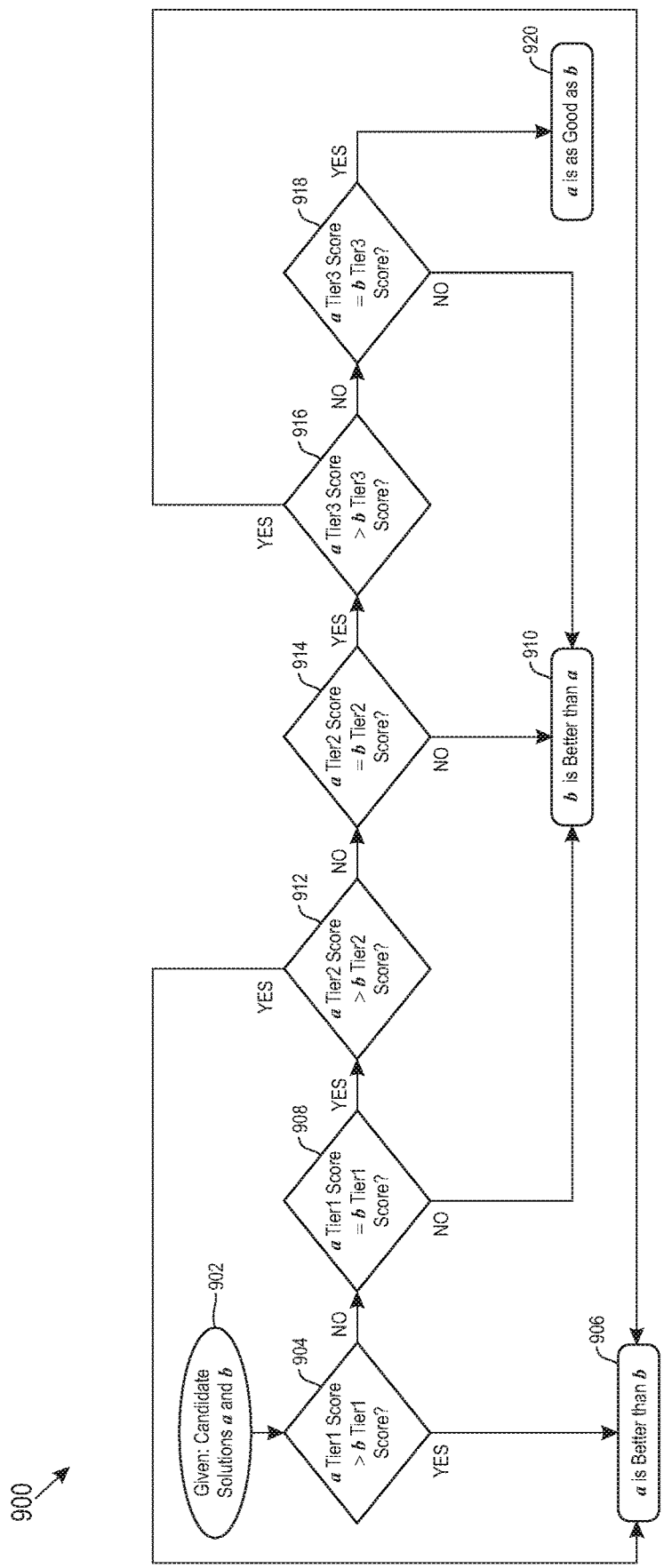
FIG. 9 depicts a flow diagram illustrating a computer-implemented method in accordance with embodiments of the invention.

FIG. 9 depicts a flow diagram illustrating a methodology 900 that can be used to compare the Tier scores of the final candidate switch rankings generated using the methodology 700 (shown in FIG. 7). In embodiments of the invention, the methodology 900 can be performed by the rank candidate resiliency-problem solutions module 470 of the resiliency recommender 120A (shown in FIG. 4). In some embodiments of the invention, the graph search and analysis functionality 520 (shown in FIG. 5) of the graph database 480A (shown in FIG. 5) can, in effect, be programmed or otherwise configured to perform the methodology 900 on the GUA 510 (shown in FIG. 5) as a proxy for any of the SAN implementations (e.g., SAN 100, 100A, 100B, 100C) described herein. In embodiments of the invention where the GUA 510 has been vectorized and embedded, the machine learning algorithms 522 (shown in FIG. 5) of the graph database 480A can, in effect, be trained or otherwise configured to perform some or all of the operations in the methodology 900. In some embodiments, the machine learning algorithms 522 can work in cooperation with the graph search and analysis module 520 to perform the methodology 900.

As shown in FIG. 9, the methodology 900 begins at block 902 where final candidate resiliency-problem solutions a and b are selected for comparison or ranking. The methodology 900 moves to decision block 904 to determine whether the Tier1 score of a is greater than the Tier1 score of b. If the answer to the inquiry at decision block 904 is yes, the methodology 900 moves to block 906 and determines that the solution a is better than the solution b. If the answer to the inquiry at decision block 904 is no, the methodology 900 moves to decision block 908 to determine whether the Tier1 score of a is equal to the Tier1 score of b. If the answer to the inquiry at decision block 908 is no, the methodology 900 moves to block 910 and determines that solution b is better than solution a. If the answer to the inquiry at decision block 908 is yes, the methodology 900 moves to decision block 912 and determines whether the Tier2 score of a is greater than the Tier2 score of b. If the answer to the inquiry at decision block 912 is yes, the methodology 900 moves to block 906 and determines that solution a is better than solution b. If the answer to the inquiry at decision block 912 is no, the methodology 900 moves to decision block 914 and determines whether the Tier2 score of a is equal to the Tier2 score of b. If the answer to the inquiry at decision block 914 is no, the methodology 900 moves to block 910 and determines that solution b is better than solution a. If the answer to the inquiry at decision block 914 is yes, the methodology 900 moves to decision block 916 and determines whether the Tier3 score of a is greater than the Tier3 score of b. If the answer to the inquiry at decision block 916 is yes, the methodology 900 moves to block 906 and determines that solution a is better than solution b. If the answer to the inquiry at decision block 916 is no, the methodology 900 moves to block decision block 918 to determine whether the Tier3 score of a is equal to the Tier3 score of b. If the answer to the inquiry at decision block 918 is no, the methodology 900 moves to block 910 and determines that the solution b is better than solution a. If the answer to the inquiry at decision block 918 is yes, the methodology 900 moves to block 920 determines that solution a is as good as solution b.

FIGS. 10, 11A, 11B, 12A, and 12B depict flow diagrams illustrating methodologies 1000, 1100A, 1100B, 1200A, 1200B that can be used to compute Tier1 scores, Tier2 scores, and Tier3 scores, respectively. In embodiments of the invention, the methodologies 1000, 1100A, 1100B, 1200A, 1200B can be performed by the rank candidate resiliency-problem solutions module 470 of the resiliency recommender 120A (shown in FIG. 4). In some embodiments of the invention, the graph search and analysis functionality 520 (shown in FIG. 5) of the graph database 480A (shown in FIG. 5) can, in effect, be programmed or otherwise configured to perform the methodologies 1000, 1100A, 1100B, 1200A, 1200B on the GUA 510 (shown in FIG. 5) as a proxy for any of the SAN implementations described herein. In embodiments of the invention where the GUA 510 has been vectorized and embedded, the machine learning algorithms 522 (shown in FIG. 5) of the graph database 480A can, in effect, be trained or otherwise configured to perform some or all of the operations in the methodologies 1000, 1100A, 1100B, 1200A, 1200B. In some embodiments, the machine learning algorithms 522 can work in cooperation with the graph search and analysis module 520 to perform the methodologies 1000, 1100A, 1100B, 1200A, 1200B.

Figure 10:
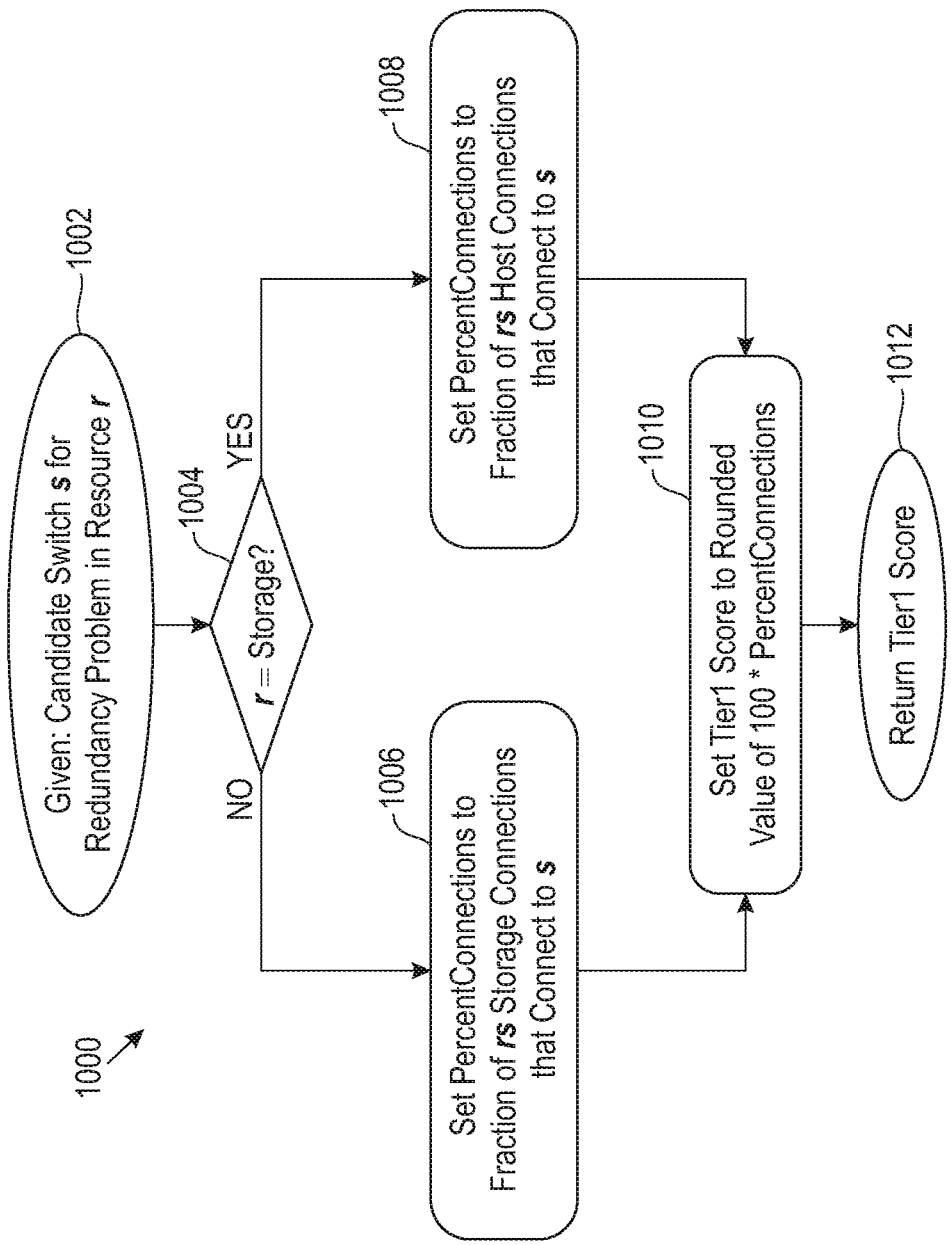
FIG. 10 depicts a flow diagram illustrating a computer-implemented method in accordance with embodiments of the invention.

Turning first to FIG. 10, there is depicted a flow diagram illustrating a methodology 1000 that can be used to generate Tier1 scores. The methodology 1000 begins at block 1002 by accessing candidate switch s for evaluating a redundancy problem in resource r. The methodology 1000 moves to decision block 1004 to determine whether the resource r is a storage area (e.g., the storage area 430 shown in FIG. 4). If the answer to the inquiry at decision block 1004 is no, the resource r is a host (e.g., one of the hosts 410 shown in FIG. 4) and the methodology 1000 moves to block 1006 to determine the percentage of the problematic components of the SAN (e.g., SAN 110B shown in FIG. 4) that are connected to corresponding resources r. The percentage of the problematic components of the SAN that are connected to corresponding resources r can be designated "percentConnections" and stored or captured as a fraction of rs storage connections that connect to s. The percentConnections computation is best explained with reference to the SAN 100C depicted in FIG. 13. In the example depicted in FIG. 13, host1 is problematic in that it is has a single failure point 1302. Problematic host1 is connected to storage1 and storage2. However, host1 is connected only through fabric1. In the course of evaluating Tier1 scores for switches, switch3 can be selected. Switch3 has no connectivity to storage1 and/or storage2. Therefore, the fraction of host1 to storage1 and storage2 through switch3 is zero (0). Substantially the same result is obtained from evaluating for switch7, switch7, switch8, switch9, and switch10. However, switch2 is in a different fabric (i.e., fabric2) than the current connectivity (e.g., switch1/fabric1) of host1, so switch2 meets the Tier1 requirement and is connected to storage1 and storage2. Accordingly, switch2 has full connectivity (i.e., one (1)) to storages for host1, and therefore switch2 is assigned a score of one hundred (100). Referring still to the SAN 100C depicted in FIG. 13, if switch6 was NOT connected to storage1 but was instead connected to storage2, storage3, and storage4, in such a case switch6 would have only 0.5 connectivity to storages needed by host1 and hence switch6 would receive a score of fifty (50). Similar logic applies when looking for redundancy problems from the storage system's side (i.e. at block 1008 when r is a storage system). The methodology 1000 moves to block 1010 where the fractional value (percentConnections) developed at block 1006 is multiplied by 100 to generate a rounded whole number. For example, where percentConnections is computed as $80/100$ (or 0.80) at block 1006, $80/100$ would be multiplied by 100 at block 1010 to generate 80 as the Tier1 score. Subsequent to block 1010, the methodology 1000 moves to block 1012 and returns the Tier1 score computed at blocks 1006 and 1010.

Returning to the inquiry at decision block 1004, if the answer to the inquiry at decision block 1004 is yes, the resource r is a storage (e.g., one of the storage areas 430 shown in FIG. 4) and the methodology 1000 moves to block 1008 to determine the percentage of the problematic components of the SAN (e.g., SAN 110B shown in FIG. 4) that are connected to corresponding resources r. The percentage of the problematic components of the SAN that are connected to corresponding resources r can be designated "percentConnections" and stored or captured as a fraction of rs host connections that connect to s. Substantially the same logic applied at block 1006 is applied at block 1008 to look for redundancy problems from the storage system's side when r is a storage system). The methodology 1000 moves to block 1010 where the fractional value (percentConnections) developed at block 1008 is multiplied by 100 to generate a rounded whole number. For example, where percentConnections is computed as $^{90}\!/_{100}$ (or 0.90) at block 1008, $^{90}\!/_{100}$ would be multiplied by 100 at block 1010 to generate 90 as the Tier1 score. Subsequent to block 1010, the methodology 1000 moves to block 1012 and returns the Tier1 score computed at blocks 1008 and 1010.

Figure 11A:
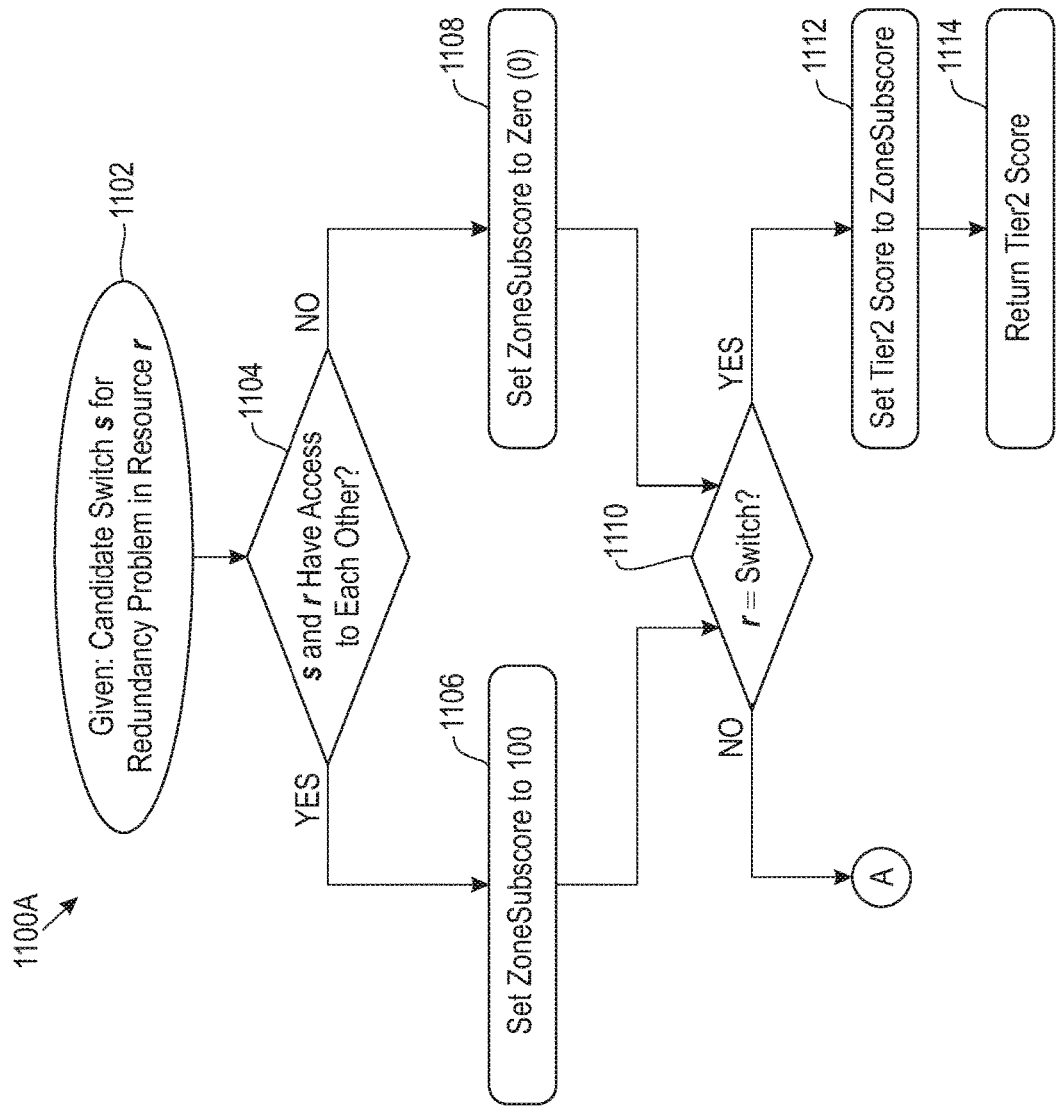
FIG. 11A depicts a flow diagram illustrating a computer-implemented method in accordance with embodiments of the invention.
Figure 11B:
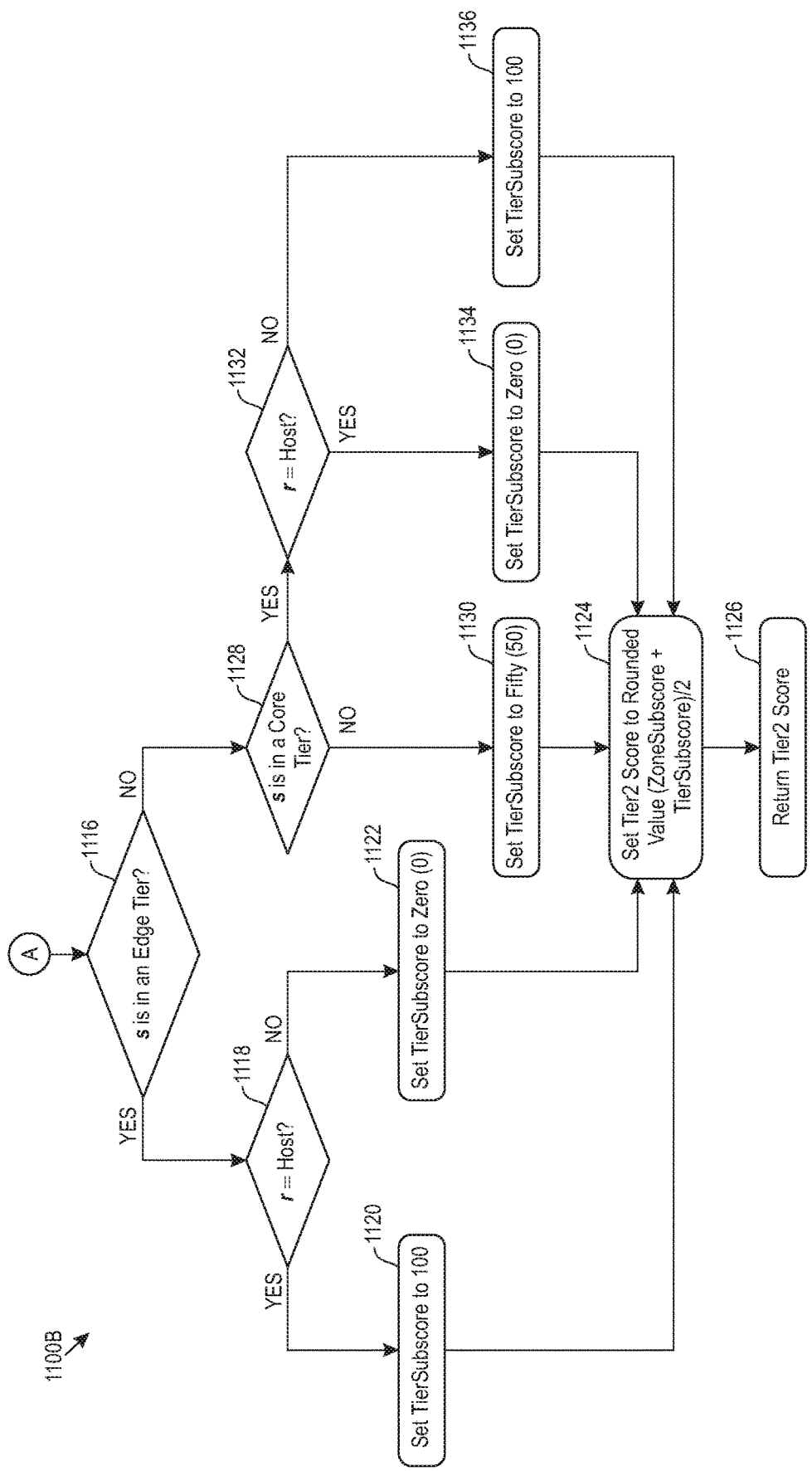
FIG. 11B depicts a flow diagram illustrating a computer-implemented method in accordance with embodiments of the invention.

Turning now to FIGS. 11A and 11B, there is depicted a two-part flow diagram illustrating a two-part methodology 1100A and 1100B that can be used to generate Tier2 scores. The methodology 1100A shown in FIG. 11A, begins at block 1102 by accessing candidate switch s for evaluating a redundancy problem in resource r. The methodology 1100A moves to decision block 1104 to determine whether r and s have access to one another. If the answer to the inquiry at decision block 1104 is yes, the methodology 1100 moves to block 1106 to "set the zoneSubscore to 100." The term "zone" in zoneSubscore is basically a reference to access control on top of a network's physical connectivity. In other words, if storage storage1 is physically connected to switch1, there is a software access control which can disable/enable this connectivity. Thus, a response of yes to the inquiry at decision block 1104 simply confirms that the zone is enabled between the two connected resources. If the answer to the inquiry at decision block 1104 is no, the zone access control disables access between the two resources, and the methodology 1100 moves to block 1108 to "set the zoneSubscore to zero (0)." As previously noted herein, the SAN fabric (e.g., fabrics 210 and/or fabric 220 shown in FIGS. 2A and 2B) is the hardware (e.g., Switch-A, Switch-B, Switch-C, Switch-D shown in FIGS. 2A and 2B) that connects host computers (e.g., Host-A and/or Host-B shown in FIGS. 2A and 2B) to storage devices (e.g., Storage-A shown in FIGS. 2A and 2B) in a SAN (e.g., SAN 100B shown in FIGS. 2A and 2B). A SAN is configured into a number of zones. These zones include host zones, system zones, and disk zones. The SAN fabric is made up of the devices which connect these zones together allowing an any-storage-any-device connection environment. A SAN fabric can contain over fifteen million connections within a single fabric. The number of devices within a SAN fabric determine what level of SAN topology can be implemented. The more complex and resilient a SAN topology is, the larger the SAN fabric require to support it.

From either block 1106 or block 1108, the methodology 1100A moves to decision block 1110 to determine whether the resource r is a switch. If the answer to the inquiry at decision block 1110 is yes, the methodology 1100A moves to block 1112 and sets the Tier2 score to the zoneSubscore. From block 1112, the methodology 1100A moves to block 1114 and returns the Tier2 score. If the answer to the inquire at decision block 1110 is no, the methodology 1110A moves to block A of the methodology 1100B (shown in FIG. 11B), which connects the methodology 1100A to the methodology 1100B shown in FIG. 11B.

Turning now to FIG. 11B, the methodology 1100B moves from block A to decision block 1116 to determine whether s is in an edge Tier. An edge Tier switch means a switch which is at the edge of a SAN switch network, which further means the switch(es) which would connect directly to the host. A core Tier switch on the other hand is a switch that is on the other side, i.e., which would connect directly to a storage system of the SAN. In accordance with aspects of the invention, in case of a tie in scoring of switches in the Tier1 score analysis, this criteria helps in determining which switch should have preference. If the answer to the inquiry at decision block 1116 is yes, the methodology 1100B move to decision block 1118 to determine whether the resource r is a host (e.g., one of the hosts 410 shown in FIG. 4). If the answer to the inquiry at decision block 1118 is yes, the methodology 1100B moves to block 1120 and sets the TierSubscore to 100. The yes response to the inquiry at decision block 1118 simply means that the switch is an edge tier switch for a host and therefore such an edge switch would receive a TierSubscore of one hundred (100). If the answer to the inquiry at decision block 1118 is no, the methodology 1100B moves to block 1122 and sets the TierSubscore to zero (0). From either block 1120 or block 1122, the methodology 1100B moves to block 1124 and sets the Tier2 score to a rounded value of (zoneSubscore+TierSubscore)/2. The operations at block 1124 ensure that there is connectivity enabled between the resource and the switch (i.e., zone) and that the switch will be directly connected to the resource (edge/core tier). From block 1124, the methodology 1100B moves to block 1126 and returns the Tier2 score.

Returning to decision block 1116, if the answer to the inquiry at decision block 1116 is no, the methodology 1100B move to decision block 1128 to determine whether the s is in a core Tier. If the answer to the inquiry at decision block 1128 is no, the methodology 1100B moves to block 1130 and sets the TierSubscore to fifty (50) following the previously-described rationale for setting connectivity to fifty (50). From block 1130, the methodology 1100B moves to block 1124 and sets the Tier2 score to a rounded value of (zoneSubscore+TierSubscore)/2. From block 1124, the methodology 1100B moves to block 1126 and returns the Tier2 score.

Returning to decision block 1128, if the answer to the inquiry at decision block 1128 is yes, the methodology 1100B moves to decision block 1132 to determine whether the resource r is a host (e.g., one of the hosts 410 shown in FIG. 4). If the answer to the inquiry at decision block 1132 is yes, the methodology 1100B moves to block 1134 and sets the TierSubscore to zero (0). The yes response to the inquiry at decision block 1132 simply means that the switch is a core tier switch for a host and therefore such an edge switch would receive a TierSubscore of zero (0). If the answer to the inquiry at decision block 1132 is no, the resource is a storage and the methodology 1100B moves to block 1136 and sets the TierSubscore to one hundred (100). From either block 1134 or block 1136, the methodology 1100B moves to block 1124 and sets the Tier2 score to a rounded value of (zoneSubscore+TierSubscore)/2. From block 1124, the methodology 1100B moves to block 1126 and returns the Tier2 score.

Figure 12A:
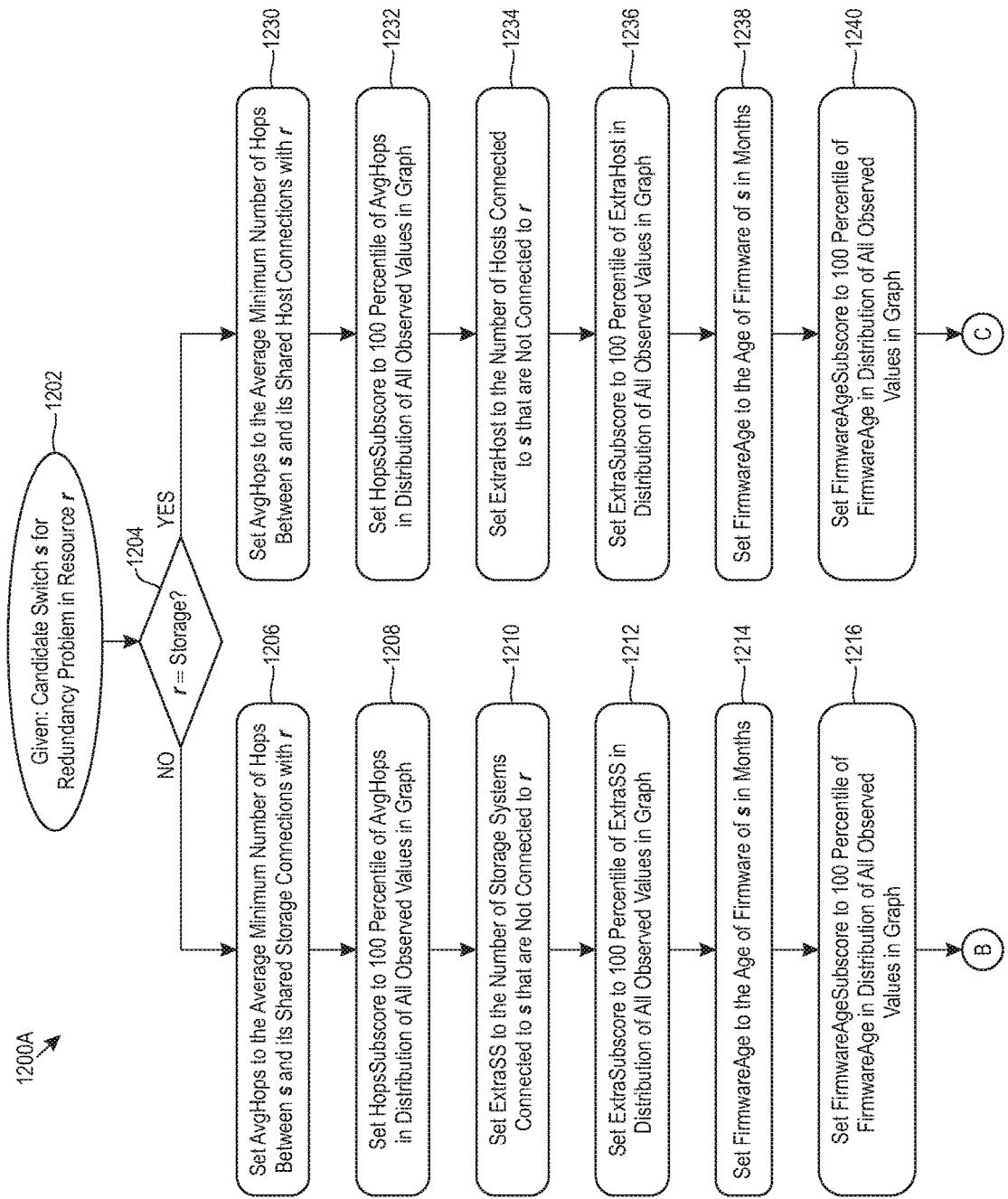
FIG. 12A depicts a flow diagram illustrating a computer-implemented method in accordance with embodiments of the invention.
Figure 12B:
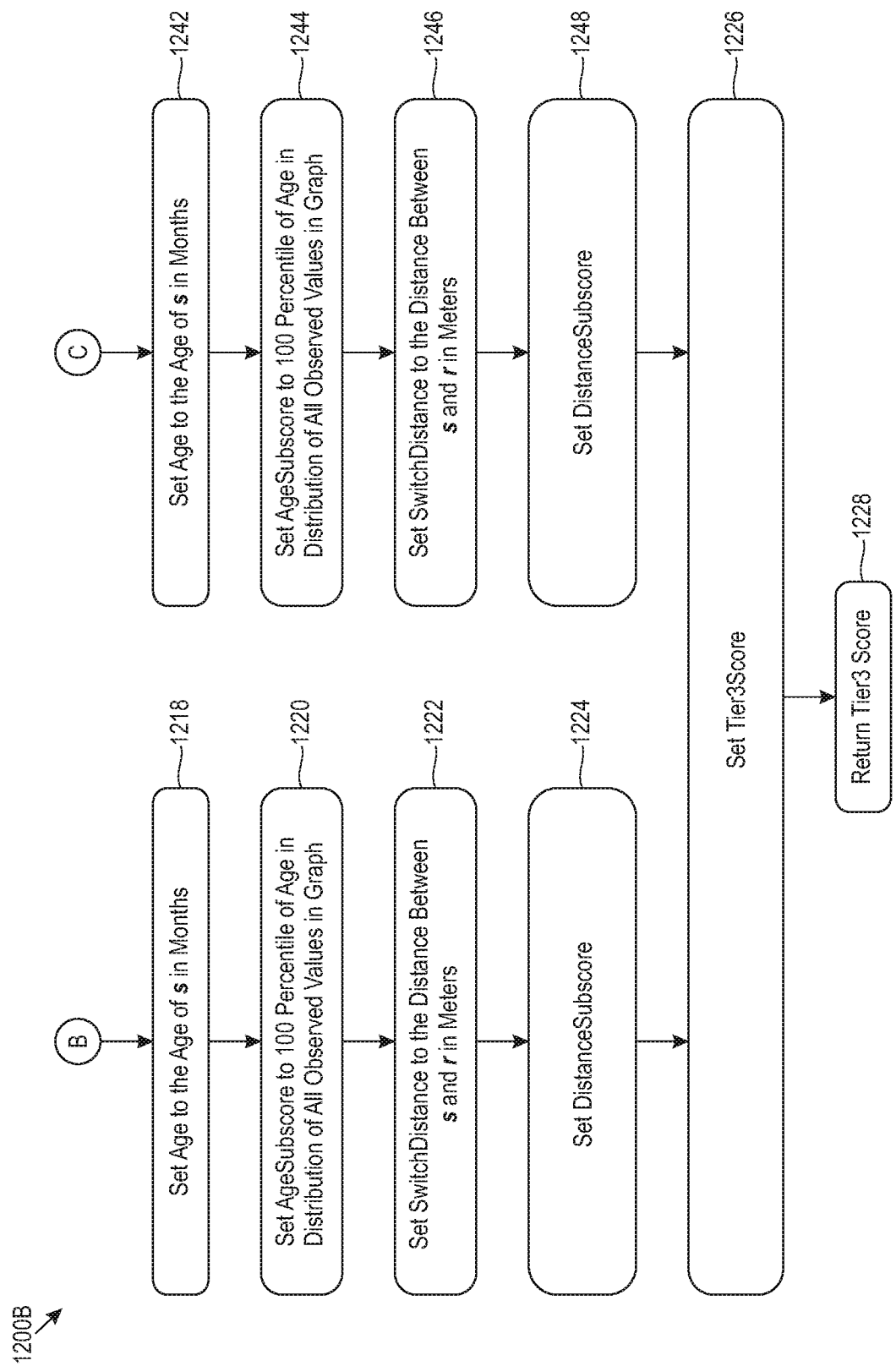
FIG. 12B depicts a flow diagram illustrating a computer-implemented method in accordance with embodiments of the invention.

Turning now to FIGS. 12A and 12B, there is depicted a two-part flow diagram illustrating a two-part methodology 1200A and 1200B that can be used to generate Tier3 scores. The methodology 1200A shown in FIG. 12A begins at block 1202 by accessing candidate switch s for evaluating a redundancy problem in resource r. The methodology 1200A moves to decision block 1204 to determine whether the resource r is a storage (e.g., one of the storage areas 430 shown in FIG. 4). If the answer to the inquiry at decision block 1204 is no, the methodology 1200A moves to block 1206 and sets the avgHops to the average minimum number of hops between s and its shared storage connections with r. The methodology 1200A moves to block 1208 and sets hopsSubscore to 100 percentile of the avgHops in the distribution of all observed values in the graph. The operations at block 1208 compare the avgHops of s to the avgHops of all other switches that have connections with r's storage connections (the other switches avgHops values). Looking across the avgHops for all switches, a determination is made as to where the switch stands. If it were the lowest (non-zero) value, it would receive a hopsSubscore equal to one hundred (100). This means that switches with fewer steps to get to the target storage will rank higher relative to those that need to pass through more intermediate switches. The methodology 1200A moves to block 1210 and sets extraSS to the number of storage systems connected to s that are not connected to r. The designation extraSS refers to connections from s that are to a storage that is not needed by r and which represent potential bad-neighbor traffic generators. If the switch is used to connect to lots of storage other than those of interest to r, those connections can end up competing with r for the resources of the switch. Thus, fewer extraSS connections is considered better. The methodology 1200A moves to block 1212 and sets extraSubscore to 100 percentile of extraSS in the distribution of all observed values in graph. The operations at block 1212 compare the extrasSS of s relative to other switches that have connections to r's relevant storage, and thus their own extraSS values. It gives the rank of s versus the other switches, with low extraSS values being better. The methodology 1200A moves to block 1214 and sets firmwareAge to the age of firmware of s in months. The methodology 1200A moves to block 1216 and sets firmwareAgeSubscore to 100 percentile of firmwareAge in distribution of all observed values in graph. The operations at block 1212 determine where the firmwareAge of s stands relative to the firmwareAge of all other switches. Lower firmwareAge values are considered better. Having the lowest age of all switches is best (=100). The firmwareAge can be an indicator of overall system age and of continuing updates or end-of-service aging. Thus, a newer component is considered better. From block 1216, the methodology 1200A moves to block B. of the methodology 1200B (shown in FIG. 12B), which connects the methodology 1200A to the methodology 1200B.

Turning now to FIG. 12B, the methodology 1200B moves from block B to block 1218 to set the relevant hardware age to the age of s in months. The methodology 1200B moves to block 1220 to set ageSubscore to 100 percentile of age in distribution of all observed values in graph. In general, hardware age is based on any suitable, consistent criteria. In some embodiments of the invention, the consistent criteria could be the "sales" date of the system (if, for example, the sales dates are known, for example, based on using the hardware's serial number to look up the sales dates in an external database). In some embodiments of the invention, the consistent criteria could be based on a "model first available" date based on public sales literature or internal data source information. In some embodiments of the invention, the hardware age could be a value simply given by the owner of the system 100, 100A, 100B as part of the setup of the overall system 100, 100A, 100B. Thus, ageSubscore is the relative age of s versus all other switches known, with the lowest age being the best (=100). Older machines are more likely to have age related problems (e.g., worn out capacitors in power supplies) than newer machines. The methodology 1200B moves to block 1222 to set swithchDistance to the distance between s and r in meters. The methodology 1200B moves to block 1224 to set distanceSubscore to 100 percentile of swithchDistance in distribution of all observed values in graph. The switchDistance serves as an estimate of the likely wire length between r and s. The further parts are apart, the more their wires are subject to path breakage due to wire damage—more wire/fiber means more surface subject to potential trauma. Additionally, longer distances can be subject to more noise in the line and more error correction, thereby reducing bandwidth. Thus, shorter is considered better. From block 1224, the methodology 1200B moves to block 1226 and sets tier3Score by taking the 5 sub-scores (hopsSubscore+extraSubscore+firmwareAgeSubscore+AgeSubscore+distanceSubscore) which are computed so that 100 for each is the "best" possible value and average them. From block 1226, the methodology 1200B moves to block 1228 and returns the Tier3 score.

Figure 15:
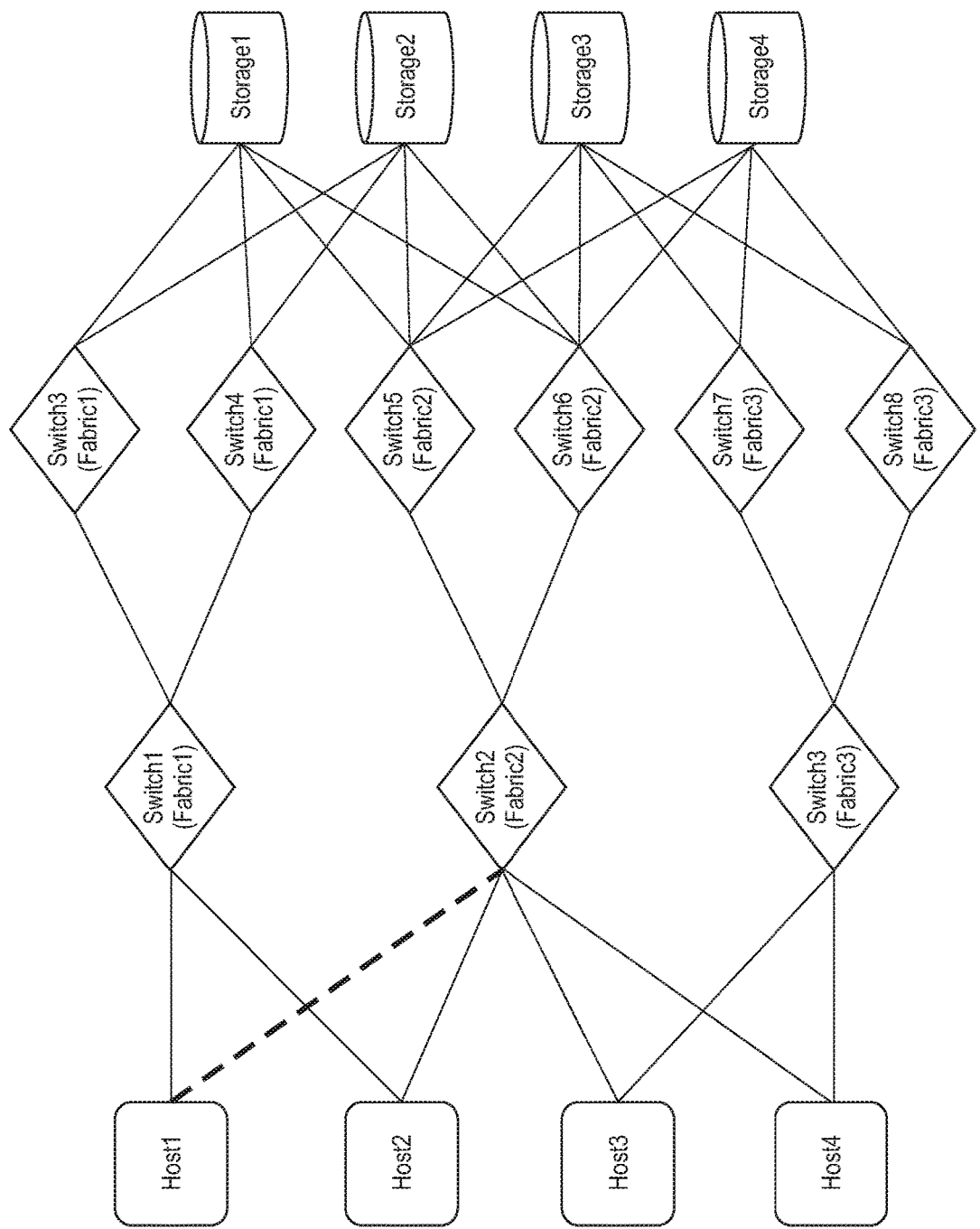
FIG. 15 depicts a simplified block diagram illustrating an example of how a resiliency recommender system can be applied to a SAN in accordance with embodiments of the invention.

Returning to decision block 1204, if the answer to the inquiry at decision block is yes, the methodologies 1200A, 1200B proceed through blocks 1230, 1232, 1234, 1236, 1238, 1240, C, 1242, 1244, 1246, 1248, 1226, and 1228 as shown in FIGS. 12A and 12B. The operations at block 1230 correspond to the operations at block 1206; the operations at block 1232 correspond to the operations at block 1208; the operations at block 1234 correspond to the operations at block 1210; the operations at block 1236 correspond to the operations at block 1212; the operations at block 1238 correspond to the operations at block 1214; the operations at block 1240 correspond to the operations at block 1216; block C corresponds to block B; the operations at block 1242 correspond to the operations at block 1218; the operations at block 1244 correspond to the operations at block 1220; the operations at block 1246 correspond to the operations at block 1222; and the operations at block 1248 correspond to the operations at block 1224. Accordingly, because the operations at blocks 1230, 1232, 1234, 1236, 1238, 1240, C, 1242, 1244, 1246, and 1248 are substantially the same as the operations at blocks 1206, 1208, 1210, 1212, 1214, 1216, 1218, 1220, 1222, and 1224, descriptions of the operations at blocks 1230, 1232, 1234, 1236, 1238, 1240, C, 1242, 1244, 1246, and 1248 are not repeated in the interest of brevity. The differences between the operations at blocks 1230, 1232, 1234, 1236, 1238, 1240, C, 1242, 1244, 1246, 1248 and the operations at blocks 1206, 1208, 1210, 1212, 1214, 1216, 1218, 1220, 1222, 1224, 122 are that the leftmost operations are performed when r is a host and the rightmost operations are performed when r is a storage, and what is connected to the switch under the two scenarios (host vs. storage), FIGS. 13, 14, and 15 depict examples of the results of applying the methodologies depicted in FIGS. 6, 7, 8, 9, 10, 11A, 11B, 12A, and 12B to a SAN 100C shown in FIGS. 13 and 15. As shown in FIG. 13, the SAN 100C includes five hosts (host1, host2, host3, host4, host5), five switch fabrics (fabric1, fabric2, fabric3, fabric4, fabric5), ten switches (switch1, switch2, switch3, switch4, switch5, switch6, switch1, switch8, switch9, switch10), and five storage areas (storage1, storage2, storage3, storage4, storage5). The resiliency recommender 120, 120A (shown in FIGS. 1 and 4) can be used to identify the single failure point 1302, where the connection from host1 to switch1 in fabric1 is the only entry point for host1 to communicate with storage1 or storage2. The methodologies depicted in FIGS. 6, 7, 8, 9, 10, 11A, 11B, 12A, and 12B are applied to the SAN 100C shown in FIG. 13 to generate a table 1400 shown in FIG. 14. The table 1400 depicts the ranked solutions to the single point failure 1302. As shown, the resiliency recommender 120, 120A automatically and dynamically identifies the single point failure 1302 and determines the highest ranked solution to the single point failure 1302 is to connect host1 to switch2. FIG. 15 depicts the SAN 100C after the solution depicted by the table 1400 has been implemented by providing a connection between host1 and switch2 in fabric2.

Accordingly, it can be seen from the foregoing detailed description that embodiments of the invention provide technical benefits and effects by providing a graph-based mechanism configured and arranged in a novel way to analyze resiliency issues in the configuration of a computer network. Representing the computer network as a graph model allows network components and network relationships to be captured and preserved. Representing the computer network as a graph also allows a resiliency-problem identification analysis to be performed on the graph model that identifies resiliency problems in the graph model, where the identified resiliency problems represent corresponding resiliency problems in the computer network. Representing the computer network as a graph also allows a resiliency-problem solution analysis to be applied to a resiliency problem in the set of resiliency problems to generate a set of resiliency-problem solutions, which are then ranked. Accordingly, the above-described computer system enables the automatic identification of resiliency problems in a large and complicated computer network; the automatic evaluation of multiple complex resiliency-problems solutions; and the automatic ranking of the multiple complex resiliency-problem solutions to enable the fast (e.g., in milliseconds) and consistent identification of resiliency problems and generation of the most effective solution(s) to the identified resiliency problems.

Implementing the graph model to include a graph database provides technical effects and benefits by leveraging features, operators, and general functionality of the graph database to implement aspects of the invention, including the resiliency-problem identification analysis, the resiliency-problem solution analysis, and the ranking operations. The graph database implements a number of efficient operations that can be leveraged to create a graph structure model; query the graph structure model for various conditions in the graph structure model; and/or transform subsections of the graph structure model. Implementing the graph model to include a graph database also enables scaling of the above-described computer system to large computer networks having, for example, hundreds of components (e.g., hosts, switches, and storage components) and thousands of connections and potential connections.

In embodiments of the invention described herein, the resiliency-problem solution analysis includes generating a set of initial candidate resiliency-problem solutions; and generating, using a set of final candidate resiliency-problem solution criteria, a set of final candidate resiliency-problem solutions from the set of initial candidate resiliency-problem solutions, wherein the set of resiliency-problem solutions includes the set of final candidate resiliency-problem solutions. The above-described implementation of the resiliency-problem solution analysis provides technical effects and benefits by using a set of final candidate resiliency-problem solution criteria to limit the number of resiliency problems that need to be ranked, thereby reducing the computational burden of performing ranking operations. The final candidate resiliency-problem solution criteria provide further technical effects and benefits by allowing the final candidate resiliency-problem solution criteria to be tailored for the particular resiliency issue (e.g., where the resiliency issue is a redundancy issue), and to be further tailored to meet the priorities and preferences of each individual user of the computer system.

Embodiments of the invention described herein, rank each final candidate resiliency-problem solution by assigning to each final candidate resiliency-problem solution one of a plurality of ranking tiers. In some embodiments of the invention, assigning to each final candidate resiliency-problem solution one of the plurality of ranking tiers is based at least in part on a set of ranking criteria. In some embodiments of the invention, the set of ranking criteria includes a set of user-determined ranking criteria. The ranking operations provide technical effects and benefits by using ranking tiers to provide a consistent standard for evaluating/ranking the final candidate resiliency-problem solutions, thereby reducing potential inconsistent ranking determination. The use of ranking criteria provides further technical effects and benefits by allowing the ranking criteria to be tailored for the particular resiliency issue (e.g., where the resiliency issue is a redundancy issue), and to be further tailored to meet the priorities and preferences of each individual user of the computer system.

Embodiments of the invention are operable to perform processor system operations that include accessing a graph model representation of a SAN of a data center computer network, where the SAN includes SAN switches, and where the graph model includes a graph database. The graph database is used to implement a resiliency-problem identification analysis that identifies a set of resiliency problems in the SAN switches represented in the graph database. The graph database is further used to apply a resiliency-problem solution analysis to a resiliency problem in the set of resiliency problems to generate a set of resiliency-problem solutions. Each resiliency-problem solution in the set of resiliency-problem solutions is ranked.

The above-described computer system provides technical effects and benefits by providing a graph-based mechanism configured and arranged in a novel way to analyze resiliency issues in the configuration of a SAN of a data center computer network, where the SAN includes SAN switches. Representing the SAN as a graph model allows SAN components and SAN network-based relationships to be captured and preserved. Representing the SAN as a graph also allows a resiliency-problem identification analysis to be performed on the graph model that identifies resiliency problems in the SAN switches represented in the graph database, where the identified resiliency problems represent corresponding resiliency problems in the SAN switches of the SAN. Representing the SAN as a graph also allows a resiliency-problem solution analysis to be applied to a resiliency problem in the set of resiliency problems to generate a set of resiliency-problem solutions, which are then ranked. Accordingly, the above-described computer system enables the automatic identification of resiliency problems in a large and complicated SAN; the automatic evaluation of multiple complex resiliency-problems solutions; and the automatic ranking of the multiple complex resiliency-problem solutions to enable the fast (e.g., in milliseconds) and consistent identification of resiliency problems and generation of the most effective solution(s) to the identified resiliency problems.

Implementing the graph model to include a graph database provides technical effects and benefits by leveraging features, operators, and general functionality of the graph database to implement aspects of the invention, including the resiliency-problem identification analysis, the resiliency-problem solution analysis, and the ranking operations. The graph database implements a number of efficient operations that can be leveraged to create a graph structure model; query the graph structure model for various conditions in the graph structure model; and/or transform subsections of the graph structure model. Implementing the graph model to include a graph database also enables scaling of the above-described computer system to a large SAN having, for example, hundreds of components (e.g., hosts, switches, and storage components) and thousands of connections and potential connections.

Additional details of how the various machine learning algorithms and models used in connection with embodiments of the invention are now described. In some embodiments of the invention, the machine learning algorithms can be configured as a type of classifier system capable of implementing various aspects of the invention described herein. More specifically, the functionality of the classifier system is used in embodiments of the invention to generate various models and/or sub-models that can be used to implement computer functionality in embodiments of the invention. The classifier system can include multiple data sources in communication through a network with a classifier. In some aspects of the invention, the data sources can bypass the network and feed directly into the classifier. The data sources provide data/information inputs that will be evaluated by the classifier in accordance with embodiments of the invention. The data sources also provide data/information inputs that can be used by the classifier to train and/or update model(s) created by the classifier. The data sources can be implemented as a wide variety of data sources, including but not limited to, sensors configured to gather real time data, data repositories (including training data repositories), and outputs from other classifiers. The network can be any type of communications network, including but not limited to local networks, wide area networks, private networks, the Internet, and the like.

Figure 16:
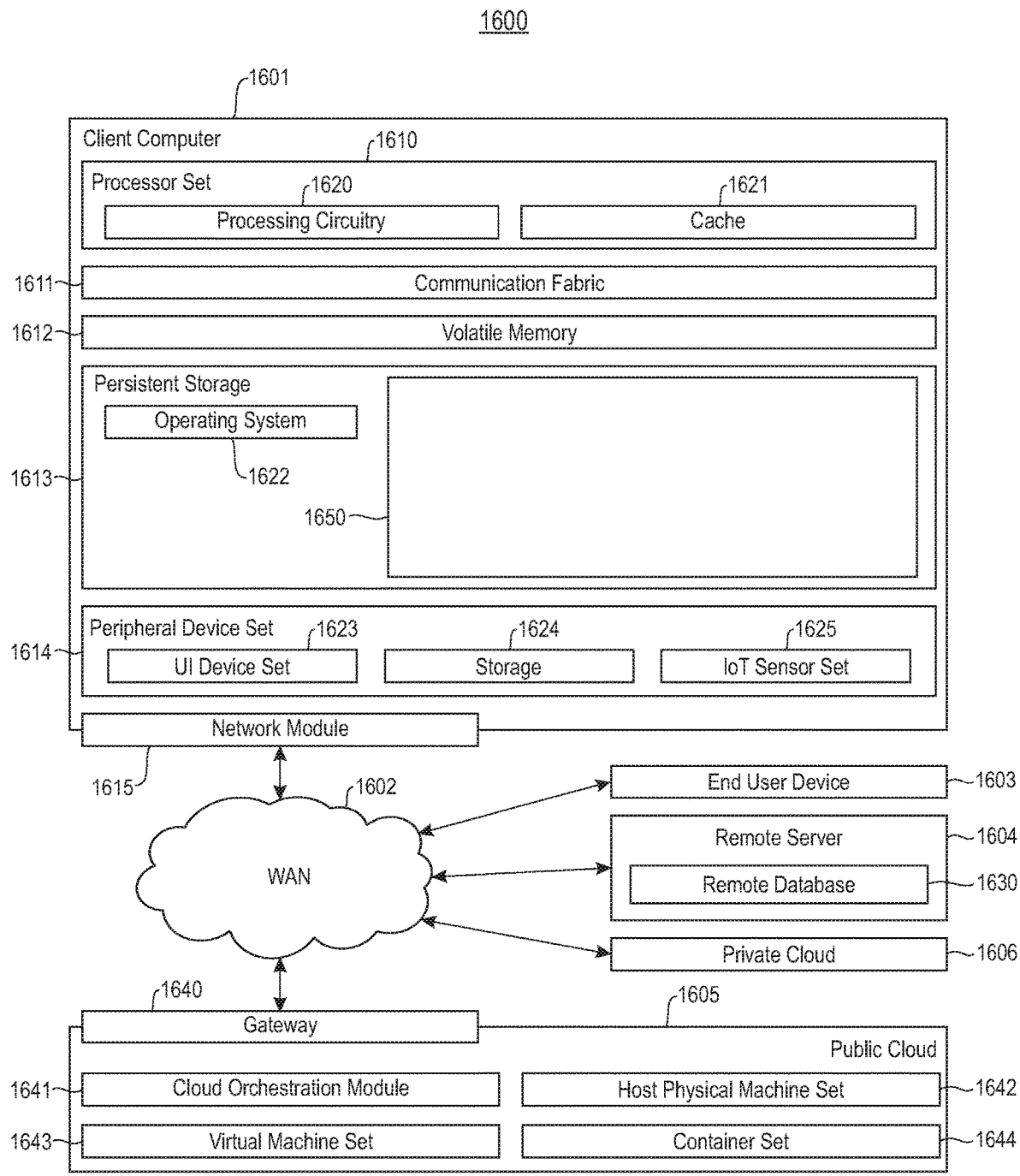
FIG. 16 depicts details of an exemplary computing environment operable to implement embodiments of the invention.

The classifier can be implemented as algorithms executed by a programmable computer such as the computing environment 1600 (shown in FIG. 16). The classifier can include a suite of machine learning (ML) algorithms; natural language processing algorithms; and model(s) that are relationship (or prediction) algorithms generated (or learned) by the ML algorithms. The NLP algorithms includes text recognition functionality that allows the classifier, and more specifically the ML algorithms, to receive natural language data (e.g., text written as English alphabet symbols) and apply elements of language processing, information retrieval, and machine learning to derive meaning from the natural language inputs and potentially take action based on the derived meaning. The NLP algorithms used in accordance with aspects of the invention can also include speech synthesis functionality that allows the classifier to translate the result(s) generated by the classifier into natural language (text and audio) to communicate aspects of the result(s) as natural language communications.

The NLP and ML algorithms receive and evaluate input data (i.e., training data and data-under-analysis) from the data sources. The ML algorithms include functionality that is necessary to interpret and utilize the input data's format. For example, where the data sources include image data, the ML algorithms can include visual recognition software configured to interpret image data. The ML algorithms apply machine learning techniques to received training data (e.g., data received from one or more of the data sources) in order to, over time, create/train/update one or more models that model the overall task and the sub-tasks that the classifier is designed to complete.

A learning phase is performed by the ML algorithms to generate the above-described models. In the learning phase, the classifier extracts features from the training data and converts the features to vector representations that can be recognized and analyzed by the ML algorithms. The feature vectors are analyzed by the ML algorithm to "classify" the training data against the target model (or the model's task) and uncover relationships between and among the classified training data. Examples of suitable implementations of the ML algorithms include but are not limited to neural networks, support vector machines (SVMs), logistic regression, decision trees, hidden Markov Models (HMMs), etc. The learning or training performed by the ML algorithms can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier and the ML algorithms. Unsupervised learning can utilize additional learning/training methods including, for example, clustering, anomaly detection, neural networks, deep learning, and the like.

When the models are sufficiently trained by the ML algorithms, the data sources that generate "real world" data are accessed, and the "real world" data is applied to the models to generate usable versions of the classifier results. In some embodiments of the invention, the classifier results can be fed back to the classifier and used by the ML algorithms as additional training data for updating and/or refining the models.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 16 depicts an example computing environment 1600 that can be used to implement aspects of the invention. Computing environment 1600 contains an example of an environment for the execution of at least some of the computer code involved in performing the inventive methods, such as a novel resiliency recommender 1650 operable to automatically and dynamically identify resiliency problems and generate ranked solutions to the identified resiliency problems. In addition to block 1650, computing environment 1600 includes, for example, computer 1601, wide area network (WAN) 1602, end user device (EUD) 1603, remote server 1604, public cloud 1605, and private cloud 1606. In this embodiment, computer 1601 includes processor set 1610 (including processing circuitry 1620 and cache 1621), communication fabric 1611, volatile memory 1612, persistent storage 1613 (including operating system 1622 and block 1650, as identified above), peripheral device set 1614 (including user interface (UI) device set 1623, storage 1624, and Internet of Things (IoT) sensor set 1625), and network module 1615. Remote server 1604 includes remote database 1630. Public cloud 1605 includes gateway 1640, cloud orchestration module 1641, host physical machine set 1642, virtual machine set 1643, and container set 1644.

COMPUTER 1601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1630. As is well understood in the art of computer technology, and depending upon the technology, performance of a computer-implemented method may be distributed among multiple computers and/or between multiple locations. On the other hand, in this presentation of computing environment 1600, detailed discussion is focused on a single computer, specifically computer 1601, to keep the presentation as simple as possible. Computer 1601 may be located in a cloud, even though it is not shown in a cloud in FIG. 16. On the other hand, computer 1601 is not required to be in a cloud except to any extent as may be affirmatively indicated.

PROCESSOR SET 1610 includes one, or more, computer processors of any type now known or to be developed in the future. Processing circuitry 1620 may be distributed over multiple packages, for example, multiple, coordinated integrated circuit chips. Processing circuitry 1620 may implement multiple processor threads and/or multiple processor cores. Cache 1621 is memory that is located in the processor chip package(s) and is typically used for data or code that should be available for rapid access by the threads or cores running on processor set 1610. Cache memories are typically organized into multiple levels depending upon relative proximity to the processing circuitry. Alternatively, some, or all, of the cache for the processor set may be located "off chip." In some computing environments, processor set 1610 may be designed for working with qubits and performing quantum computing.

Computer readable program instructions are typically loaded onto computer 1601 to cause a series of operational steps to be performed by processor set 1610 of computer 1601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1621 and the other storage media discussed below. The program instructions, and associated data, are accessed by processor set 1610 to control and direct performance of the inventive methods. In computing environment 1600, at least some of the instructions for performing the inventive methods may be stored in block 1650 in persistent storage 1613.

COMMUNICATION FABRIC 1611 is the signal conduction path that allows the various components of computer 1601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1612 is any type of volatile memory now known or to be developed in the future. Examples include dynamic type random access memory (RAM) or static type RAM. Typically, volatile memory 1612 is characterized by random access, but this is not required unless affirmatively indicated. In computer 1601, the volatile memory 1612 is located in a single package and is internal to computer 1601, but, alternatively or additionally, the volatile memory may be distributed over multiple packages and/or located externally with respect to computer 1601.

PERSISTENT STORAGE 1613 is any form of non-volatile storage for computers that is now known or to be developed in the future. The non-volatility of this storage means that the stored data is maintained regardless of whether power is being supplied to computer 1601 and/or directly to persistent storage 1613. Persistent storage 1613 may be a read only memory (ROM), but typically at least a portion of the persistent storage allows writing of data, deletion of data and re-writing of data. Some familiar forms of persistent storage include magnetic disks and solid state storage devices. Operating system 1622 may take several forms, such as various known proprietary operating systems or open source Portable Operating System Interface-type operating systems that employ a kernel. The code included in block 1650 typically includes at least some of the computer code involved in performing the inventive methods.

PERIPHERAL DEVICE SET 1614 includes the set of peripheral devices of computer 1601. Data communication connections between the peripheral devices and the other components of computer 1601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1623 may include components such as a display screen, speaker, microphone, wearable devices (such as goggles and smart watches), keyboard, mouse, printer, touchpad, game controllers, and haptic devices. Storage 1624 is external storage, such as an external hard drive, or insertable storage, such as an SD card. Storage 1624 may be persistent and/or volatile. In some embodiments, storage 1624 may take the form of a quantum computing storage device for storing data in the form of qubits. In embodiments where computer 1601 is required to have a large amount of storage (for example, where computer 1601 locally stores and manages a large database) then this storage may be provided by peripheral storage devices designed for storing very large amounts of data, such as a storage area network (SAN) that is shared by multiple, geographically distributed computers. IoT sensor set 1625 is made up of sensors that can be used in Internet of Things applications. For example, one sensor may be a thermometer and another sensor may be a motion detector.

NETWORK MODULE 1615 is the collection of computer software, hardware, and firmware that allows computer 1601 to communicate with other computers through WAN 1602. Network module 1615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1615 are performed on the same physical hardware device. In other embodiments (for example, embodiments that utilize software-defined networking (SDN)), the control functions and the forwarding functions of network module 1615 are performed on physically separate devices, such that the control functions manage several different network hardware devices. Computer-readable program instructions for performing the inventive methods can typically be downloaded to computer 1601 from an external computer or external storage device through a network adapter card or network interface included in network module 1615.

WAN 1602 is any wide area network (for example, the internet) capable of communicating computer data over non-local distances by any technology for communicating computer data, now known or to be developed in the future. In some embodiments, the WAN 1602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1603 is any computer system that is used and controlled by an end user (for example, a customer of an enterprise that operates computer 1601), and may take any of the forms discussed above in connection with computer 1601. EUD 1603 typically receives helpful and useful data from the operations of computer 1601. For example, in a hypothetical case where computer 1601 is designed to provide a recommendation to an end user, this recommendation would typically be communicated from network module 1615 of computer 1601 through WAN 1602 to EUD 1603. In this way, EUD 1603 can display, or otherwise present, the recommendation to an end user. In some embodiments, EUD 1603 may be a client device, such as thin client, heavy client, mainframe computer, desktop computer and so on.

REMOTE SERVER 1604 is any computer system that serves at least some data and/or functionality to computer 1601. Remote server 1604 may be controlled and used by the same entity that operates computer 1601. Remote server 1604 represents the machine(s) that collect and store helpful and useful data for use by other computers, such as computer 1601. For example, in a hypothetical case where computer 1601 is designed and programmed to provide a recommendation based on historical data, then this historical data may be provided to computer 1601 from remote database 1630 of remote server 1604.

PUBLIC CLOUD 1605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1605 is performed by the computer hardware and/or software of cloud orchestration module 1641. The computing resources provided by public cloud 1605 are typically implemented by virtual computing environments that run on various computers making up the computers of host physical machine set 1642, which is the universe of physical computers in and/or available to public cloud 1605. The virtual computing environments (VCEs) typically take the form of virtual machines from virtual machine set 1643 and/or containers from container set 1644. It is understood that these VCEs may be stored as images and may be transferred among and between the various physical machine hosts, either as images or after instantiation of the VCE. Cloud orchestration module 1641 manages the transfer and storage of images, deploys new instantiations of VCEs and manages active instantiations of VCE deployments. Gateway 1640 is the collection of computer software, hardware, and firmware that allows public cloud 1605 to communicate through WAN 1602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1606 is similar to public cloud 1605, except that the computing resources are only available for use by a single enterprise. While private cloud 1606 is depicted as being in communication with WAN 1602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1605 and private cloud 1606 are both part of a larger hybrid cloud.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer system comprising a processor system electronically coupled to a memory, wherein the processor system is operable to perform processor system operations comprising:
implementing a resiliency-problem identification analysis that comprises executing a graph model representation of a computer network operable to, when executed, generate a first type of query outputs responsive to a first type of query inputs, wherein the first type of query outputs comprises a set of resiliency problems in the graph model;
implementing a resiliency-problem solution analysis that comprises executing the graph model representation of the computer network operable to, when executed, generate a second type of query outputs responsive to a second type of query inputs, wherein the second type of query inputs comprises a resiliency problem in the set of resiliency problems, wherein the second type of query outputs comprises a set of resiliency-problem solutions; and
ranking each resiliency-problem solution in the set of resiliency-problem solutions.

2. The computer system of claim 1, wherein the graph model comprises a graph database of the processor system.

3. The computer system of claim 1, wherein implementing the resiliency-problem solution analysis by executing the graph model representation of the computer network to generate the second type of query outputs comprises the graph model:
generating a set of initial candidate resiliency-problem solutions; and
generating, using a set of final candidate resiliency-problem solution criteria, a set of final candidate resiliency-problem solutions from the set of initial candidate resiliency-problem solutions.

4. The computer system of claim 3, wherein the set of resiliency-problem solutions comprises the set of final candidate resiliency-problem solutions.

5. The computer system of claim 4, wherein ranking each final candidate resiliency-problem solution comprises assigning to each final candidate resiliency-problem solution one of a plurality of ranking tiers.

6. The computer system of claim 5, wherein assigning to each final candidate resiliency-problem solution one of the plurality of ranking tiers is based at least in part on a set of ranking criteria.

7. The computer system of claim 6, wherein the set of ranking criteria comprises a set of user-determined ranking criteria.

8. A computer-implemented method comprising:
implementing a resiliency-problem identification analysis that comprises executing a graph model representation of a computer network operable to, when executed, generate a first type of query outputs responsive to a first type of query inputs, wherein the first type of query outputs comprise a set of resiliency problems in the graph model;
implementing a resiliency-problem solution analysis that comprises executing the graph model representation of the computer network operable to, when executed, generate a second type of query outputs responsive to a second type of query inputs, wherein the second type of query inputs comprises a resiliency problem in the set of resiliency problems, wherein the second type of query outputs comprises a set of resiliency-problem solutions; and
ranking each resiliency-problem solution in the set of resiliency-problem solutions.

9. The computer-implemented method of claim 8, wherein the graph model comprises a graph database of the processor system.

10. The computer-implemented method of claim 9, wherein implementing the resiliency-problem solution analysis by executing the graph model representation of the computer network to generate the second type of query outputs comprises the graph model:
  generating a set of initial candidate resiliency-problem solutions; and
  generating, using a set of final candidate resiliency-problem solution criteria, a set of final candidate resiliency-problem solutions from the set of initial candidate resiliency-problem solutions.

11. The computer-implemented method of claim 10, wherein the set of resiliency-problem solutions comprises the set of final candidate resiliency-problem solutions.

12. The computer-implemented method of claim 11, wherein ranking each final candidate resiliency-problem solution comprises assigning to each final candidate resiliency-problem solution one of a plurality of ranking tiers.

13. The computer-implemented method of claim 12, wherein assigning to each final candidate resiliency-problem solution one of the plurality of ranking tiers is based at least in part on a set of ranking criteria.

14. The computer-implemented method of claim 13, wherein the set of ranking criteria comprises a set of user-determined ranking criteria.

15. A computer program product comprising a computer readable program stored on a computer readable storage medium, wherein the computer readable program, when executed on a processor system, causes the processor system to perform processor system operations comprising:
  implementing a resiliency-problem identification analysis that comprises executing a graph model representation of a computer network operable to, when executed, generate a first type of query outputs responsive to a first type of query inputs, wherein the first type of query outputs comprises a set of resiliency problems in the graph model;
  implementing a resiliency-problem solution analysis that comprises executing the graph model representation of the computer network operable to, when executed, generate a second type of query outputs responsive to a second type of query inputs, wherein the second type of query inputs comprises a resiliency problem in the set of resiliency problems, wherein the second type of query outputs comprises a set of resiliency-problem solutions; and
  ranking each resiliency-problem solution in the set of resiliency-problem solutions.

16. The computer program product of claim 15, wherein the graph model comprises a graph database of the processor system.

17. The computer program product of claim 15, wherein implementing the resiliency-problem solution analysis by executing the graph model representation of the computer network to generate the second type of query outputs comprises the graph model:
  generating a set of initial candidate resiliency-problem solutions; and
  generating, using a set of final candidate resiliency-problem solution criteria, a set of final candidate resiliency-problem solutions from the set of initial candidate resiliency-problem solutions.

18. The computer program product of claim 17, wherein the set of resiliency-problem solutions comprises the set of final candidate resiliency-problem solutions.

19. The computer program product of claim 18, wherein ranking each final candidate resiliency-problem solution comprises assigning to each final candidate resiliency-problem solution one of a plurality of ranking tiers.

20. The computer program product of claim 19, wherein assigning to each final candidate resiliency-problem solution one of the plurality of ranking tiers is based at least in part on a set of ranking criteria.

21. The computer program product of claim 20, wherein the set of ranking criteria comprises a set of user-determined ranking criteria.

22. A computer system comprising a processor system electronically coupled to a memory, wherein the processor system is operable to perform processor system operations comprising:
  implementing a resiliency-problem identification analysis that comprises executing a graph model representation of a storage area network (SAN) of a data center computer network to, when executed, generate a first type of query outputs responsive to a first type of query inputs, wherein the first type of query outputs comprises a set of resiliency problems in the SAN switches represented in the graph database;
  implementing a resiliency-problem solution analysis that comprises executing the graph model representation of the computer network operable to, when executed, generate a second type of query outputs responsive to a second type of query inputs, wherein the second type of query inputs comprises a resiliency problem in the set of resiliency problems, wherein the second type of query outputs comprises a set of resiliency-problem solutions;
  wherein the SAN comprises SAN switches;
  wherein the graph model comprises a graph database of the processor system; and
  ranking each resiliency-problem solution in the set of resiliency-problem solutions.

23. The computer system of claim 22, wherein:
  implementing the resiliency-problem solution analysis by executing the graph model representation of the SAN of the data center computer network to generate the second type of query outputs comprises the graph model:
    generating a set of initial candidate resiliency-problem solutions; and
    generating, using a set of final candidate resiliency-problem solution criteria, a set of final candidate resiliency-problem solutions from the set of initial candidate resiliency-problem solutions;
  the set of resiliency-problem solutions comprises the set of final candidate resiliency-problem solutions;
  ranking each final candidate resiliency-problem solution comprises assigning to each final candidate resiliency-problem solution one of a plurality of ranking tiers;
  assigning to each final candidate resiliency-problem solution one of the plurality of ranking tiers is based at least in part on a set of ranking criteria; and
  the set of ranking criteria comprises a set of user-determined ranking criteria.

24. A computer-implemented method comprising:
  implementing a resiliency-problem identification analysis that comprises executing a graph model representation of a storage area network (SAN) of a data center computer network to, when executed, generate a first type of query outputs responsive to a first type of query inputs, wherein the first type of query outputs comprises a set of resiliency problems in the SAN switches represented in the graph database;
  implementing a resiliency-problem solution analysis that comprises executing the graph model representation of the computer network operable to, when executed, generate a second type of query outputs responsive to a second type of query inputs, wherein the second type of query inputs comprises a resiliency problem in the set of resiliency problems, wherein the second type of query outputs comprises a set of resiliency-problem solutions;

wherein the SAN comprises SAN switches;

wherein the graph model comprises a graph database of the processor system; and ranking each resiliency-problem solution in the set of resiliency-problem solutions.

25. The computer-implemented method of claim 24, wherein:

implementing the resiliency-problem solution analysis by executing the graph model representation of the SAN of the data center computer network to generate the second type of query outputs comprises the graph model:

generating a set of initial candidate resiliency-problem solutions; and generating, using a set of final candidate resiliency-problem solution criteria, a set of final candidate resiliency-problem solutions from the set of initial candidate resiliency-problem solutions;

the set of resiliency-problem solutions comprises the set of final candidate resiliency-problem solutions;

ranking each final candidate resiliency-problem solution comprises assigning to each final candidate resiliency-problem solution one of a plurality of ranking tiers;

assigning to each final candidate resiliency-problem solution one of the plurality of ranking tiers is based at least in part on a set of ranking criteria; and the set of ranking criteria comprises a set of user-determined ranking criteria.

* * * * *